(12) United States Patent
Zhu et al.

(10) Patent No.: US 7,081,763 B1
(45) Date of Patent: Jul. 25, 2006

(54) TEST SYSTEM AND METHOD FOR FIELD MEASUREMENT OF ALIEN CROSS-TALK

(75) Inventors: Xing Zhu, Loveland, CO (US);
Harshang Pandya, Loveland, CO (US);
Kanwaljeet Singh, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 11/196,113

(22) Filed: Aug. 3, 2005

(51) Int. Cl.
*G01R 27/28* (2006.01)
*H04J 1/12* (2006.01)

(52) U.S. Cl. ................. 324/628; 324/539; 370/201
(58) Field of Classification Search ........... 324/628, 324/539; 370/201
See application file for complete search history.

(56) References Cited

U.S. PATENT DOCUMENTS

| | | | |
|---|---|---|---|
| 6,259,256 B1* | 7/2001 | Walling | 324/539 |
| 6,259,258 B1* | 7/2001 | Cook et al. | 324/628 |
| 6,285,653 B1* | 9/2001 | Koeman et al. | 370/201 |
| 6,297,647 B1* | 10/2001 | Kirk et al. | 324/628 |
| 6,912,208 B1* | 6/2005 | Zimmerman et al. | 370/282 |
| 6,937,029 B1* | 8/2005 | Gambardella et al. | 324/627 |
| 2003/0099350 A1* | 5/2003 | Bostoen et al. | 379/417 |
| 2005/0207561 A1* | 9/2005 | Hammond | 324/600 |

* cited by examiner

*Primary Examiner*—Anjan Deb
*Assistant Examiner*—Timothy J. Dole

(57) ABSTRACT

An alien cross-talk method involves a victim cable and one or more disturber cables. The method encompasses a transmission of a RF test signal on each disturber cable between an alien cross-talk test signal unit connected to one end of a disturber cable and another alien cross-talk test signal unit connected to the other end of the disturber cable. The method further involves a measurement of an alien cross-talk signal generated on the victim cable in response to each cross-talk coupling of the victim cable and the disturber cable(s) based on the transmission of the RF test signal(s) on the disturber cable(s). The RF test signal(s) can be in the form of a RF frequency sweep and the measurement of the alien cross-talk signal can involve an execution of a RF frequency measurement sweep for acquiring samples of the alien cross-talk signal generated on the victim cable.

20 Claims, 19 Drawing Sheets

TEST SYSTEM AND METHOD FOR FIELD MEASUREMENT OF ALIEN CROSS-TALK

BACKGROUND OF THE INVENTION

Alien cross-talk between cables reduces the operational bandwidth of a cabling channel because of an increased level of cross-talk noise decreasing the overall signal-to-noise ratio. Thus, with the recent deployment of high-speed networking, the measurement of alien cross-talk has become an important issue.

A powersum alien cross-talk measurement typically involves a "victim" cable having four (4) wire pairs being tested with n number of "disturber" cables, each having four (4) wire pairs. One specific approach is to test the "victim" cable with only one of the "disturber" cables at a time in the context of separately measuring powersum alien near end cross-talk ("PSANEXT") and powersum alien far end cross-talk ("PSAFEXT") for each wire pair. Drawbacks to this approach is it is extremely time consuming and error-prone.

Another specific approach is to enclose the "victim" cable with n number of "disturber" cables that are excited with white noise. Drawbacks to this approach is its complexity and power consumption with an inaccurate measurement.

Thus, a need exists to provide a solution for alien cross-talk testing in a complete, convenient, cost effective and expedient manner.

SUMMARY OF THE INVENTION

The present invention provides an alien cross-talk testing that is complete, convenient, cost effective and expedient.

A first form of the present invention is an alien cross-talk testing method includes a transmission of a first RF test signal on a first disturber cable between a first alien cross-talk test signal unit connected to one end of the first disturber cable and a second alien cross-talk test signal unit connected to the other end of the first disturber cable, a transmission of a second RF test signal on a second disturber cable between a third alien cross-talk test signal unit connected to one end of the second disturber cable and a fourth alien cross-talk test signal unit connected to the other end of the second disturber cable, and measuring an alien cross-talk signal generated on a victim cable in response to a first alien cross-talk coupling of the victim cable and the first disturber cable based on the transmission of the first RF test signal on the first disturber cable and in response to a second alien cross-talk coupling of the victim cable and the second disturber cable based on the transmission of the second RF test signal on the second disturber cable.

A second form of the present invention is an alien cross-talk testing method comprises a transmission of a RF frequency sweep test signal on a disturber cable between an alien cross-talk test signal unit connected to one end of the disturber cable and another alien cross-talk test signal unit connected to the other end of the disturber cable, and a execution of a RF frequency measurement sweep of an alien cross-talk signal generated on a victim cable in response to an alien cross-talk coupling of the victim cable and the disturber cable based on the transmission of the RF frequency sweep test signal on the disturber cable.

A third form of the present invention is an alien cross-talk testing method comprises a transmission of a RF frequency sweep test signal on a disturber cable between an alien cross-talk test signal unit connected to one end of the disturber cable and another alien cross-talk test signal unit connected to the other end of the disturber cable, and acquiring alien cross-talk data samples based on a threshold filtering of an alien cross-talk signal generated on a victim cable in response to an alien cross-talk coupling of the victim cable and the disturber cable based on the transmission of the RF frequency sweep test signal on the disturber cable.

The aforementioned forms and other forms as well as objects and advantages of the present invention will become further apparent from the following detailed description of the various embodiments of the present invention read in conjunction with the accompanying drawings. The detailed description and drawings are merely illustrative of the invention rather than limiting, the scope of the present invention being defined by the appended claims and equivalents thereof.

DETAILED DESCRIPTION

Figure 1:
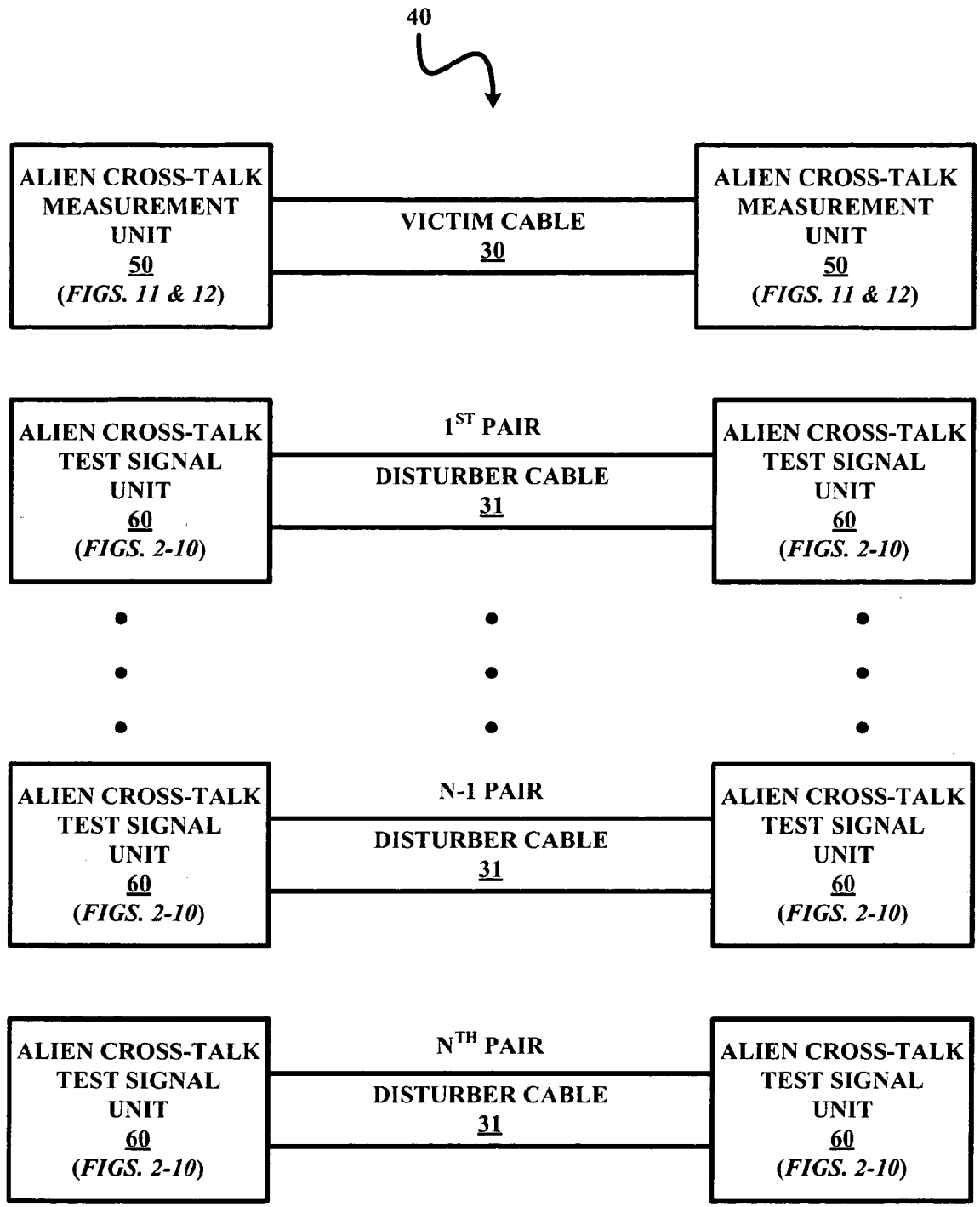
FIG. 1 illustrates one embodiment of an alien cross-talk test system in accordance with the present invention.

FIG. 1 illustrates an alien cross-talk test system 40 of the present invention employing a pair of alien cross-talk measurement units 50 and a N number of pairs of alien cross-talk test signal units 60, where N≧1. Generally, cross-talk measurement units 50 are structurally configured to be connected to opposing ends of a victim cable 30 having an M number of wire pairs, and each pair of alien cross-talk test signal units 60 are structurally configured to be connected to opposing ends of a disturber cable 31 having M number of wire pairs, where M≦1. Each pair of cross-talk generators 60 are further structurally configured to generate an alien cross-talk test signal on one end of connected disturber cable 31 and to terminate the alien cross-talk test signal on the other end of the disturber cable 31. Cross-talk measurement units 50 are further structurally configured to measure an alien cross-talk signal on one end of victim cable 30, and to terminate the alien cross-talk signal on the other end of the victim cable 30. The alien cross-talk signal on victim cable 30 is generated by an alien cross-talking coupling between victim cable 30 and a disturber cable 31 as an alien cross-talk test signal is being transmitted between corresponding alien cross-talk test signal units 60.

In practice, the present invention does not impose any limitations or any restrictions to the structural embodiments of alien cross-talk measurement units 50 and alien cross-talk test signal units 60. Thus, the following descriptions of various structural embodiments of alien cross-talk measurement units 50 connected with FIGS. 11 and 12, and various structural embodiments of alien cross-talk test signal units 60 connected with FIGS. 2–10 neither limit nor restrict a scope of structural embodiments of alien cross-talk measurement units 50 and structural embodiments of alien cross-talk test signal units 60.

Figure 2:
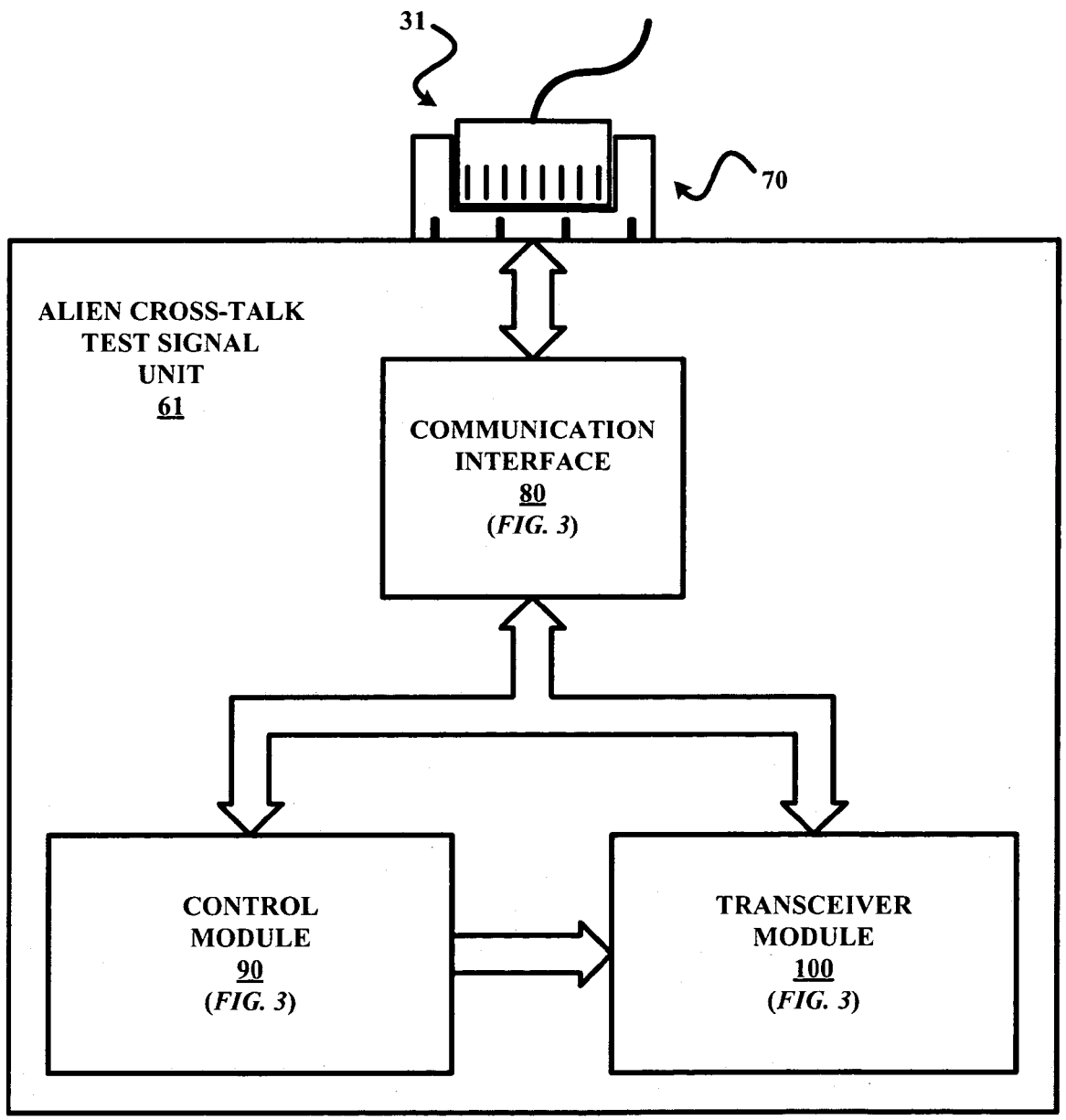
FIG. 2 illustrates one embodiment of an alien cross-talk test signal unit illustrated in FIG. 1 in accordance with the present invention.

FIG. 2 illustrates a general embodiment 61 of alien cross-talk test signal unit 60 (FIG. 1). Alien cross-talk test signal unit 61 employs a cable jack 70 (e.g., a RJ-45 jack), a communication interface 80, a control module 90 and a transceiver module 100. Cable jack 70 is structurally configured to connect test unit 61 to one end of a disturber cable 31 having four (4) wire pairs (i.e., M=4) as shown. Communication interface 80 is structurally configured to transmit and receive alien cross-talk test signals with another test unit 61 connected to an opposing end of disturber cable 31 (not shown). In an alternative embodiment, communication interface 80 is further structurally configured to exchange logical commands on behalf of control module 90 with another test unit 61 connected to an opposing end of disturber cable 31

Transceiver module 100 is structurally configured to selectively transmit an alien cross-talk test signal via interface 80 to another test unit 61 connected to the opposing end of disturber cable 31 or terminate an alien cross-talk test signal received via interface 80 from another test unit 61 connected to the opposing end of disturber cable 31. Control module 90 is structurally configured to selectively set transceiver module 100 as an alien cross-talk test signal transmitter or an alien cross-talk test signal terminator based on commands received by control module 90. In one embodiment, control module 90 is further structurally configured to manually receive the commands from a user of test unit 61. In a second embodiment, control module 90 is further structurally configured to receive logical commands via interface 80 from another test unit 61 connected to the opposing end of disturber cable 31. In a third embodiment, control is further structurally configured to receive both manual commands and logical commands.

In an alternative embodiment of test unit 61, transceiver module 100 can be structurally configured to selectively transmit an alien cross-talk test signal via interface 80 to another test unit 61 connected to the opposing end of disturber cable 31 or to be set in an idle state. For this alternative embodiment, transceiver module 100 is selectively set by control module 90 as either an active alien cross-talk test signal transmitter or an idle alien cross-talk test signal transmitter.

In an alternative embodiment of test unit 61, transceiver module 100 can be structurally configured to selectively terminate an alien cross-talk test signal received via interface 80 from another test unit 61 connected to the opposing end of disturber cable 31 or to be set in an idle state. For this alternative embodiment, transceiver module 100 is selectively set by control module 90 as either an active alien cross-talk test signal terminator or an idle alien cross-talk test signal terminator.

Figure 3:
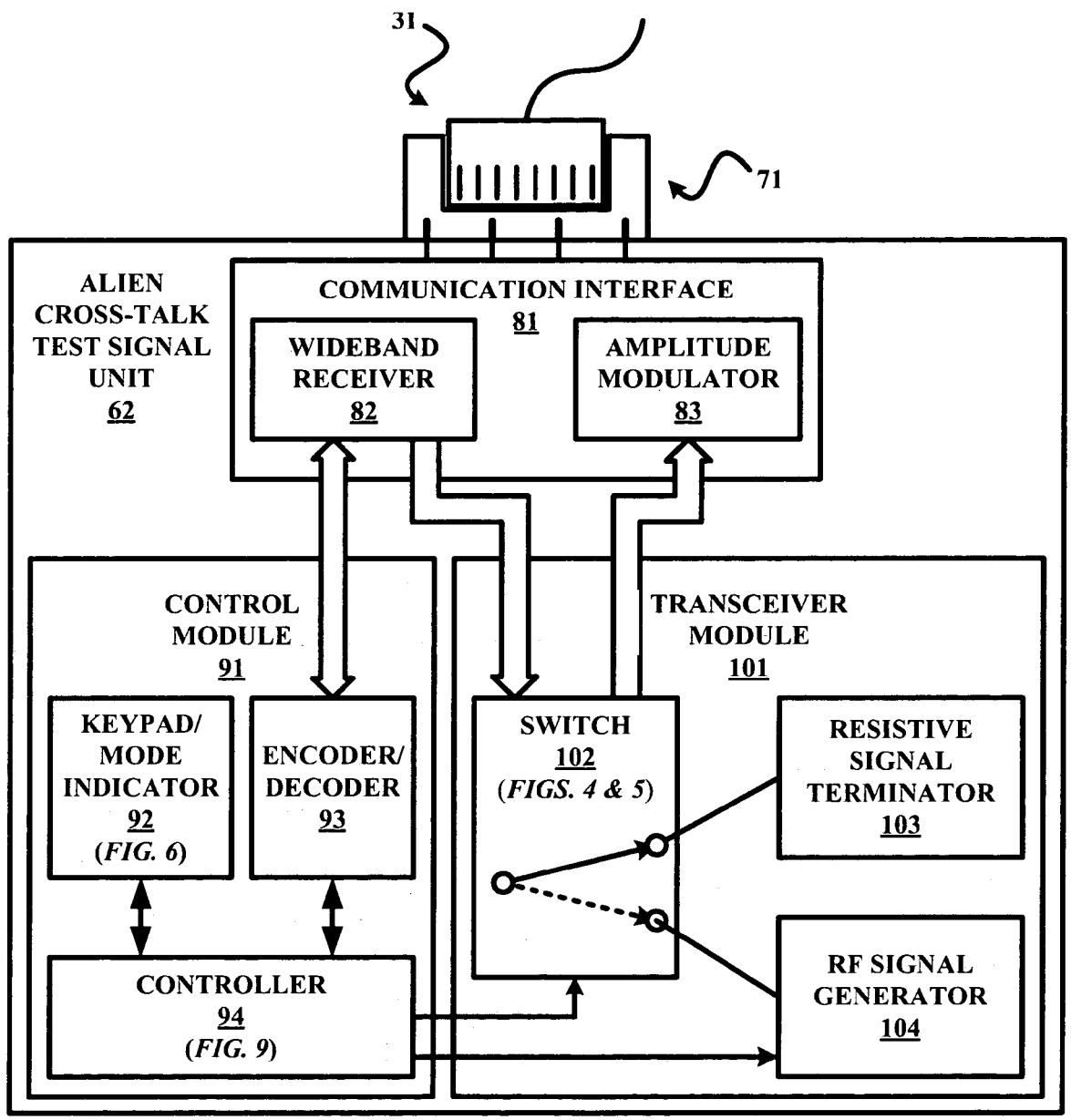
FIG. 3 illustrates one embodiment of the alien cross-talk test signal unit illustrated in FIG. 2 in accordance with the present invention.

FIG. 3 illustrates a specific embodiment 62 of alien cross-talk test signal unit 60 (FIG. 1). Cross-talk test unit 62 employs cable jack 71, a communication interface 81, a control module 91 and a transceiver module 101. Cable jack 71 is structurally configured to connect test unit 62 to one end of a disturber cable 31 having four (4) wire pairs (i.e., M=4) as shown.

Communication interface 81 includes a wideband receiver 82 structurally configured to exchange commands with and receive alien cross-talk test signals in the form of RF test signals from another test unit 62 connected to an opposing end of disturber cable 31 (not shown). Communication interface 81 further includes an amplitude modulator 83 structurally configured to amplitude modulate and transmit alien cross-talk test signals in the form of RF test signal to another test unit 62 connected to an opposing end of disturber cable 31.

Transceiver module 101 includes a switch 102, a resistive signal terminator 103 and a RF signal generator 104. Switch 102 is structurally configured to switch between resistive signal terminator 103 and RF signal generator 104 as commanded by a controller 94 of control module 91.

Resistive signal terminator 103 is structurally configured to terminate RF test signals received via receiver 82 from another test unit 62 connected to the opposing end of disturber cable 31 when resistive signal terminal 103 is connected to wideband receiver 82 via switch 102. In an exemplary embodiment, resistive signal terminator 103 is structurally configured by design to provide a 100 Ω differential termination and a 50 Ωcommon mode termination.

RF signal generator 104 is structurally configured to generate the RF test signal having a definitive test pattern as commanded by controller 94 (e.g., linear, logarithmic, stepped-up and stepped-down) whereby the RF test signal is transmitted via modulator 83 to another test unit 62 connected to the opposing end of disturber cable 31 when RF signal generator 104 is connected to amplitude modulator 83 via switch 102. In an exemplary embodiment, RF signal generator 104 is structurally configured by design to generate an AC signal (e.g., sine waves, square waves, triangular waves, ramp waves and the like) whereby the RF test signal is test patterned as commanded by controller 94 as a frequency sweep test signal having a fixed stepped-up pattern at frequencies in an alien cross-talk measurement range (e.g., 1 MHZ to 1 GHz). Those having ordinary skill in the art will appreciate other types of test patterns for a frequency sweep test signal that are applicable to the present invention.

Figure 4:
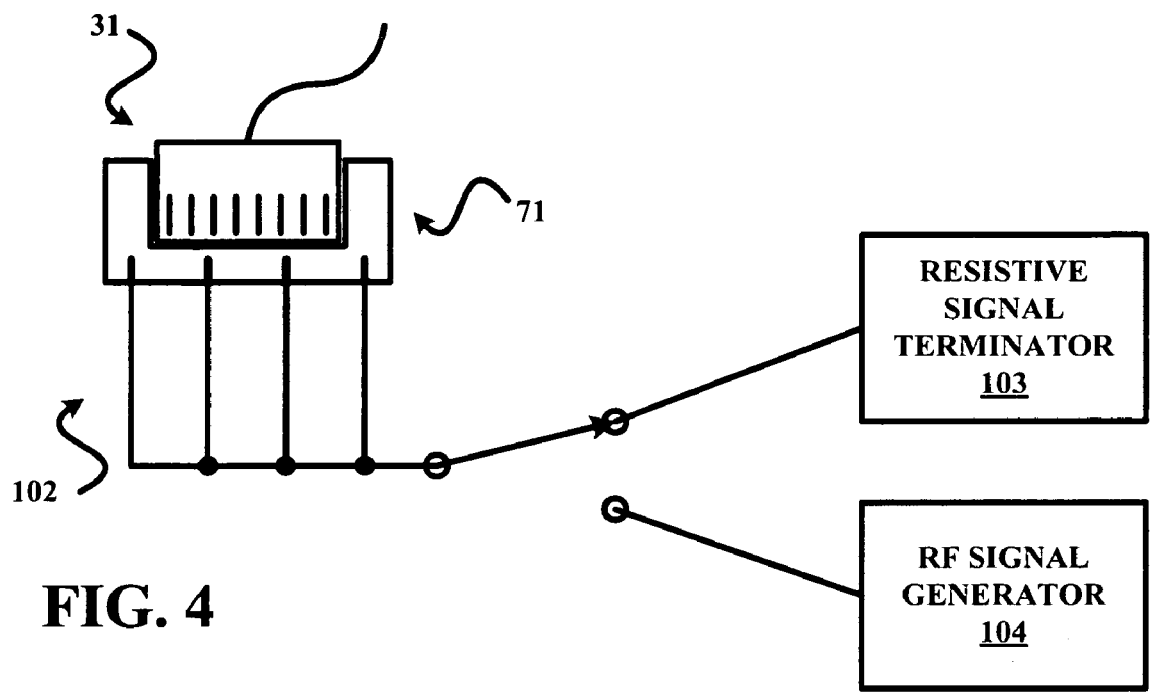
FIGS. 4 and 5 illustrate one embodiment of a switch illustrated in FIG. 3 in accordance with the present invention.
Figure 5:
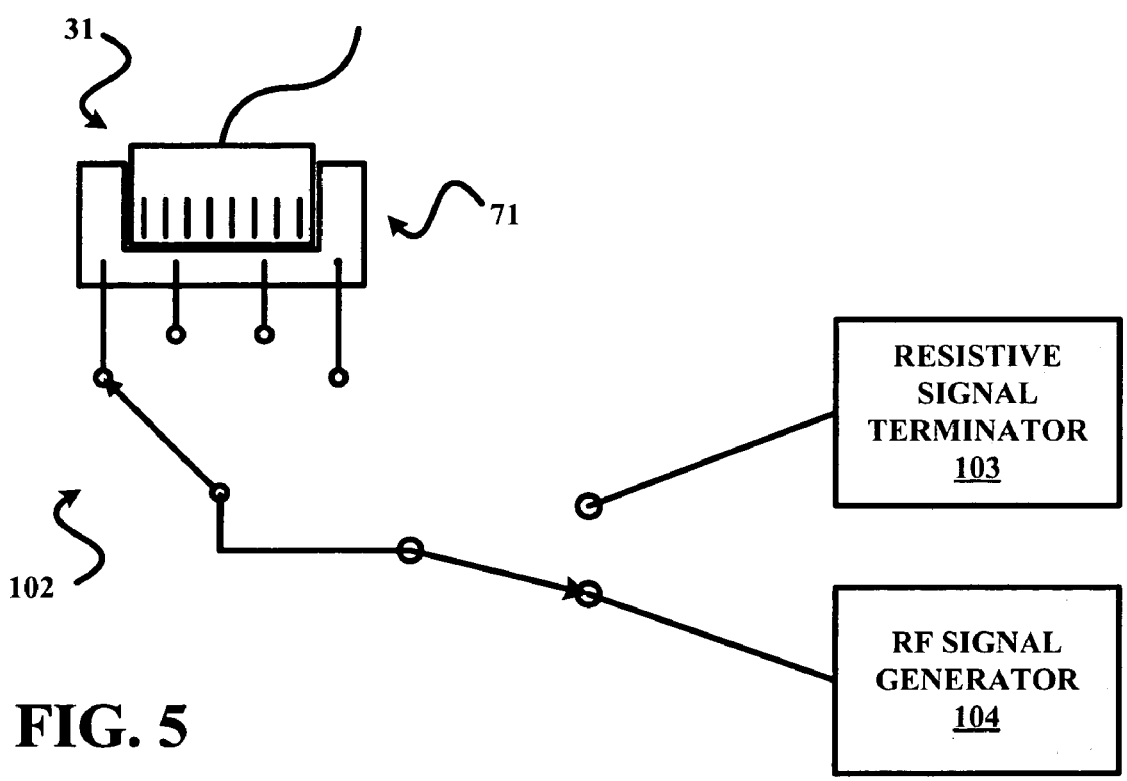

FIGS. 4 and 5 illustrates an exemplary structural configuration of switch 102 in the context of disturber cable 31 having the four (4) pairs of wires. Referring to FIG. 4, switch 102 is structurally configured to connect resistive signal terminator 103 via receiver 82 (not shown) to all four (4) pairs of wires of disturber cable 31 when commanded by controller 94 to connect resistive signal terminator 103 to disturber cable 31. Referring to FIG. 5, switch 102 is structurally configured to connect RF signal generator 104 to a specific pair of the (4) pairs of wires of disturber cable 31 via modulator 83 (not shown) when commanded by controller 94 to connect RF signal generator 104 to the specific pair of the (4) pairs of wires of disturber cable 31. In the context of the RF test signal being a stepped-up RF frequency sweep test signal, controller 94 can command switch 102 to individually select each wire pair during each frequency of the stepped-up RF frequency sweep test signal.

Figure 6:
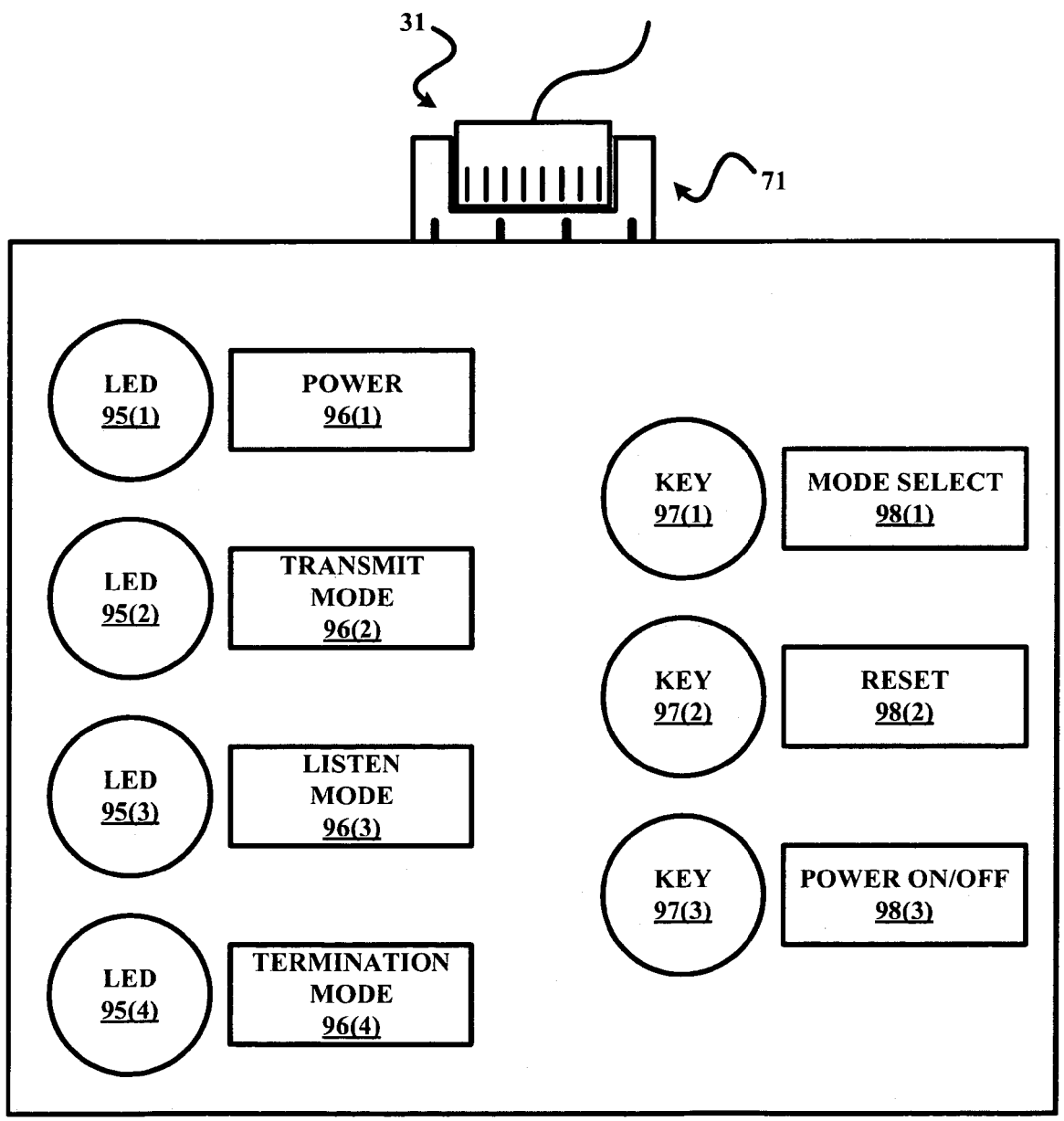
FIG. 6 illustrates one embodiment of a keypad/LED indicator illustrated in FIG. 3 in accordance with the present invention.

Referring again to FIG. 3, control module 91 includes a keypad/mode indicator 92, an encoder/decoder 93, and controller 94. Keypad/LED indicator 92 is structurally configured to visually indicate a working mode of test unit 62 as well as provide keys to facilitate a manual entry of commands to controller 94. FIG. 6 illustrates an exemplary embodiment of keypad/LED indicator 92 as mounted on an exterior of test unit 62.

Referring to FIGS. 3 and 6, indicator 92 includes four (4) pairs of a light emitting diode ("LED") 95 and a working mode label 96, and three (3) pairs of a key 97 and a command label 98. An activation of LED 95(1) indicates test unit 62 is powered on. An activation of LED 95(2) indicates test unit 62 is set in a transmit mode defined by a connection of RF signal generator 104 to amplitude modulator 83 via switch 102 as commanded by controller 94 whereby test unit 62 is operating as a RF signal transmitter. An activation of LED 95(3) indicates test unit 62 is set in a listen mode defined by a connection of resistive signal terminator to wideband receiver 82 via switch 102 as commanded by controller 94 whereby test unit 62 is operating as an active RF signal terminator. An activation of LED 95(3) indicates test unit 62 is reset in a termination mode defined by a connection of resistive signal terminator to wideband receiver 82 via switch 102 as commanded by controller 94 whereby test unit 62 is operating as a default RF signal terminator Key 97(1) enables a user of test unit 62 to manually select one of working modes of test unit 62 among the transmit mode, the listen mode and the termination mode whereby a mode selection is indicated by one of the LED(s) 95(2), 95(3) and 95(4). Key 97(2) enables a user of test unit 62 to reset test unit 62 as well as another test unit 62 connected to an opposing end of disturber cable 31 whereby the reset in indicated by an activation of LED 95(4). Key 97(3) enables a user of test unit 62 to power on or off test unit 62 as indicated by an activation or deactivation of LED 95(1).

Referring again to FIG. 3, encoder/decoder 93 is structurally configured to encode commands generated by controller 94 for another test unit 62 connected to an opposing end of disturber cable 31 and to decode commands received on behalf of controller 94 from another test unit 62 connected to an opposing end of disturber cable 31. In one embodiment, the commands are in the form of RF logical signals that are encoded and decoded as needed in accordance with the following TABLE 1:

TABLE 1

| LOGICAL SIGNAL | 01 | 10 | 11 | 00 |
|---|---|---|---|---|
| ACTION | Reset | Switch Working Mode | Feedback/ Verification | Idle |

Figure 7:
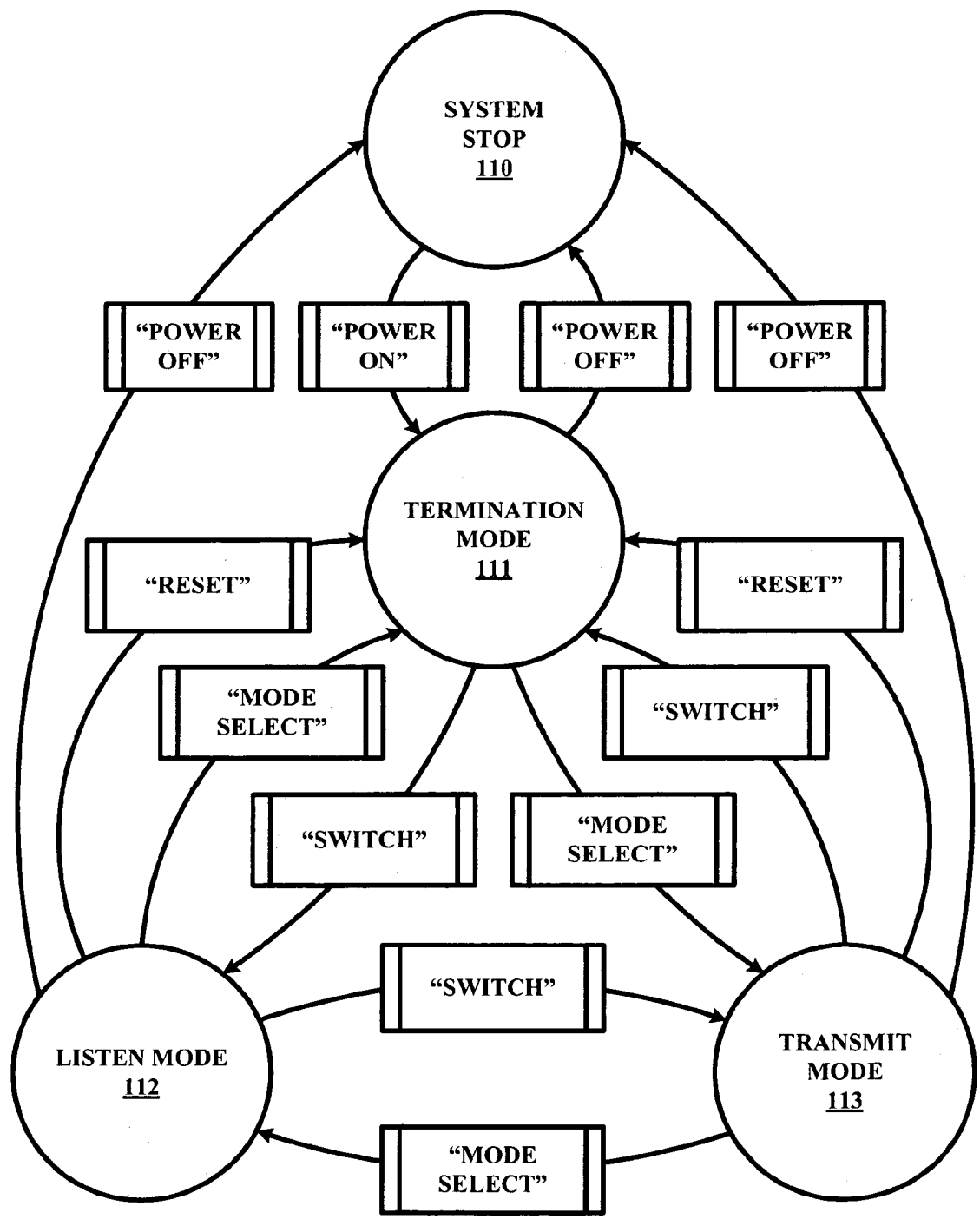
FIG. 7 illustrates one embodiment of a working mode diagram of an alien cross-talk test signal unit in accordance with the present invention.

Controller 94 is structurally configured to control a test pattern of the RF test signal by RF signal generator 104, to set switch 102 as commanded (manually or logically) to thereby control a transmission of the RF test signal to another test unit 62 connected to the opposing end of disturber cable 31 or terminate a RF test signal received from another test unit connected to the opposing end of disturber cable 31, and to exchange logic commands in accordance with TABLE 1 with another test unit 62 connected to an opposing end of disturber cable 31. These logical functions enable controller 94 to control the working mode of test unit 62 when test unit is serving as a remote test unit. FIG. 7 illustrates a state diagram of test unit 62 to facilitate an understanding of the working mode control exhibited by controller 94.

Referring to FIGS. 6 and 7, a system stop 110 is an initial state of test unit 62. Controller 94 transitions test unit 62 to a termination mode 81 as represented by the "POWER ON" arrow in response to a powering on of generator 60 via power on/off key 97(3) as indicated by LED 95(1). In a manual context, a user of test unit 62 can use mode select key 97(1) to sequentially transition among transmit mode 113, listen mode 112 and termination mode 111 as represented by the "MODE SELECT" arrows. In a logical context, test unit 62 can automatically sequentially transition among termination mode 111, listen mode 112 and transmit mode 113 as represented by the "SWITCH" arrows in response to logical commands 10 received from another test unit 62 connected to an opposing end of disturber cable 31. Additionally, test unit 62 can immediately transition from either listen mode 112 and transmit mode 113 to termination mode 111 as represented by the "RESET" arrows in response to a manual command via reset key 97(2) (FIG. 6) or in response to a logical command 01 received from another test unit 62 connected to an opposing end of disturber cable 31. At any time, test unit 62 can be transitioned back to system stop 110 upon a powering off of test unit 62 via power on/off key 97(3) as represented by the "POWER OFF" arrows.

In accordance with the state diagram, a corresponding working mode of a near end test and a far end test involving test unit 62 is listed in the following TABLE 2:

TABLE 2

|  | TESTNG CASES | | |
|---|---|---|---|
|  | STANDY | ANEXT | AFEXT |
| NEAR END WORKING MODE: | Termination | Transmit | Listen |
| FAR END WORKING MODE: | Termination | Listen | Transmit |

A description of an exemplary alien cross-talk environment will now be provided herein to facilitate an understanding of an alien cross-talking test in accordance with the present invention. In the exemplary alien cross-talk environment as shown in FIG. 8, the M number of wires pairs for the cables is four (4) and the N number of disturber cables is three (3).

Figure 8:
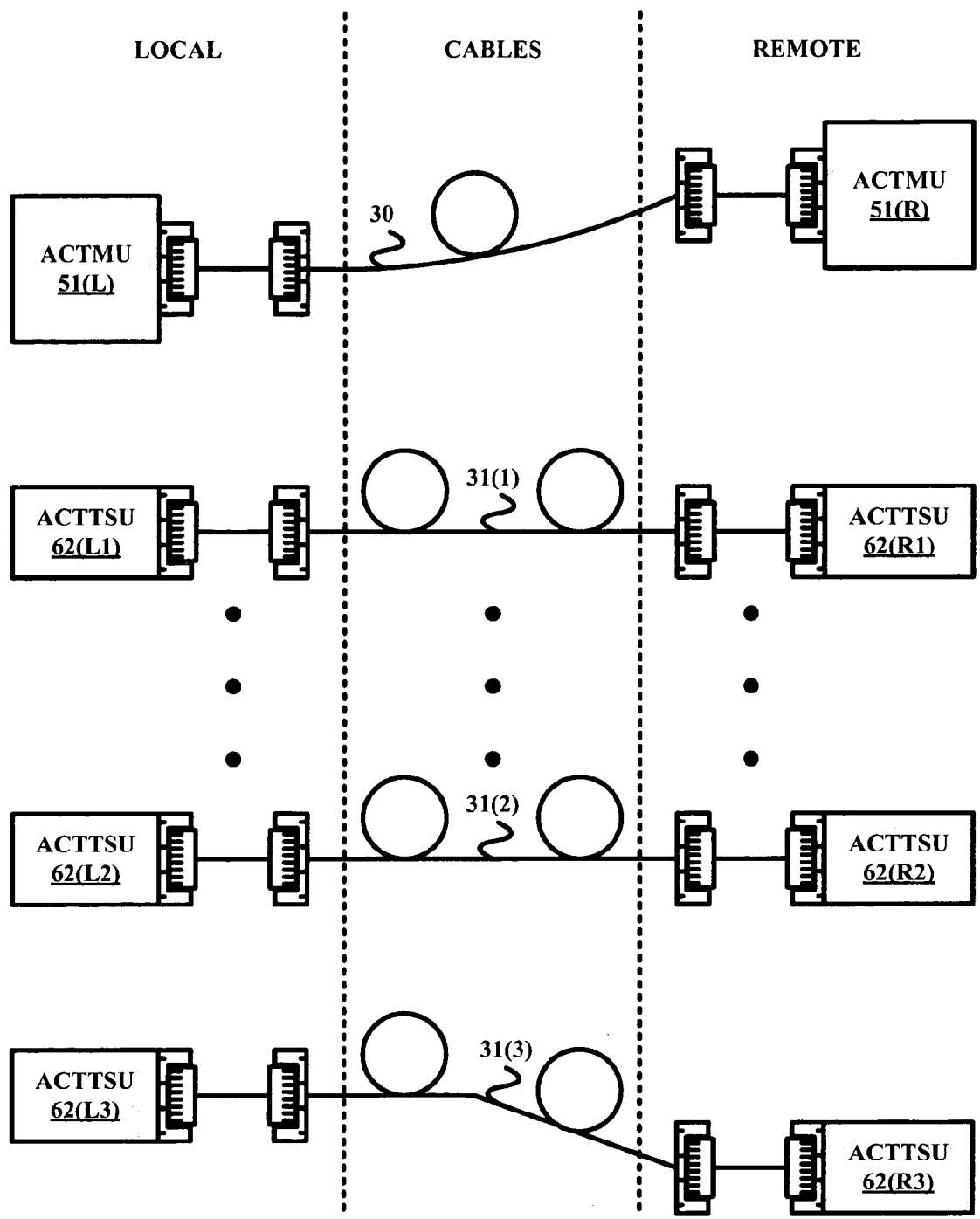
FIG. 8 illustrates one embodiment of the alien cross-talk test system illustrated in FIG. 1 in accordance with the present invention.

Referring to FIG. 8, a local alien cross-talk measurement unit ("ACTMU") 51 (L) is connected to one end of victim cable 30 and a remote alien cross-talk measurement unit 51 (R) is connected to an opposing end of victim cable 30. In one embodiment, alien cross-talk measurement units 51 are spectrum analyzers (e.g., a WireScope and a DualRemote, respectively, as sold by Agilent) or field cable testers having RJ-45 jacks or equivalent and memories that are programmed with computer code to selectively implement an alien cross-talk termination method in accordance with a flowchart 140 illustrated FIG. 11 and an alien cross-talk measurement method in accordance with a flowchart 150 illustrated in FIG. 12 as will be further explained herein.

The three (3) alien cross-talk test signal unit ("ACTTSU") 62 pairings each involve a local alien cross-talk test signal unit 62(L) connected to one end of a disturber cable 31 and a remote alien cross-talk test signal unit 62(R) connected to an opposing end of disturber cable 31. A controller 94 of each test unit 62 is programmed to selectively implement a RF test signal generation method in accordance with a flowchart 120 illustrated FIG. 9 and RF test signal termination method in accordance with a flowchart 130 illustrated in FIG. 10 as will be further explained herein.

Flowcharts 120 and 130 will now be explained in the context of each test unit 62 being in the termination mode prior to receiving a command to transition to either the transmit mode or the listen mode.

Figure 9:
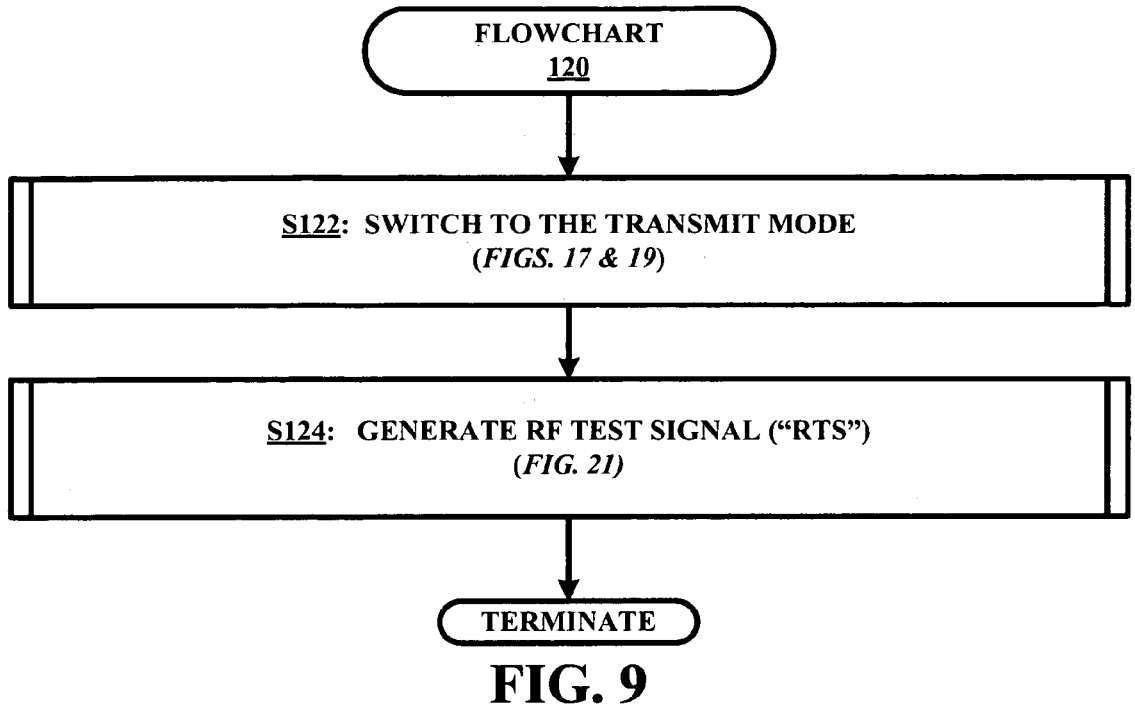
FIG. 9 illustrates a flowchart representative of one embodiment of a RF test signal generation method in accordance with the present invention.
Figure 13:
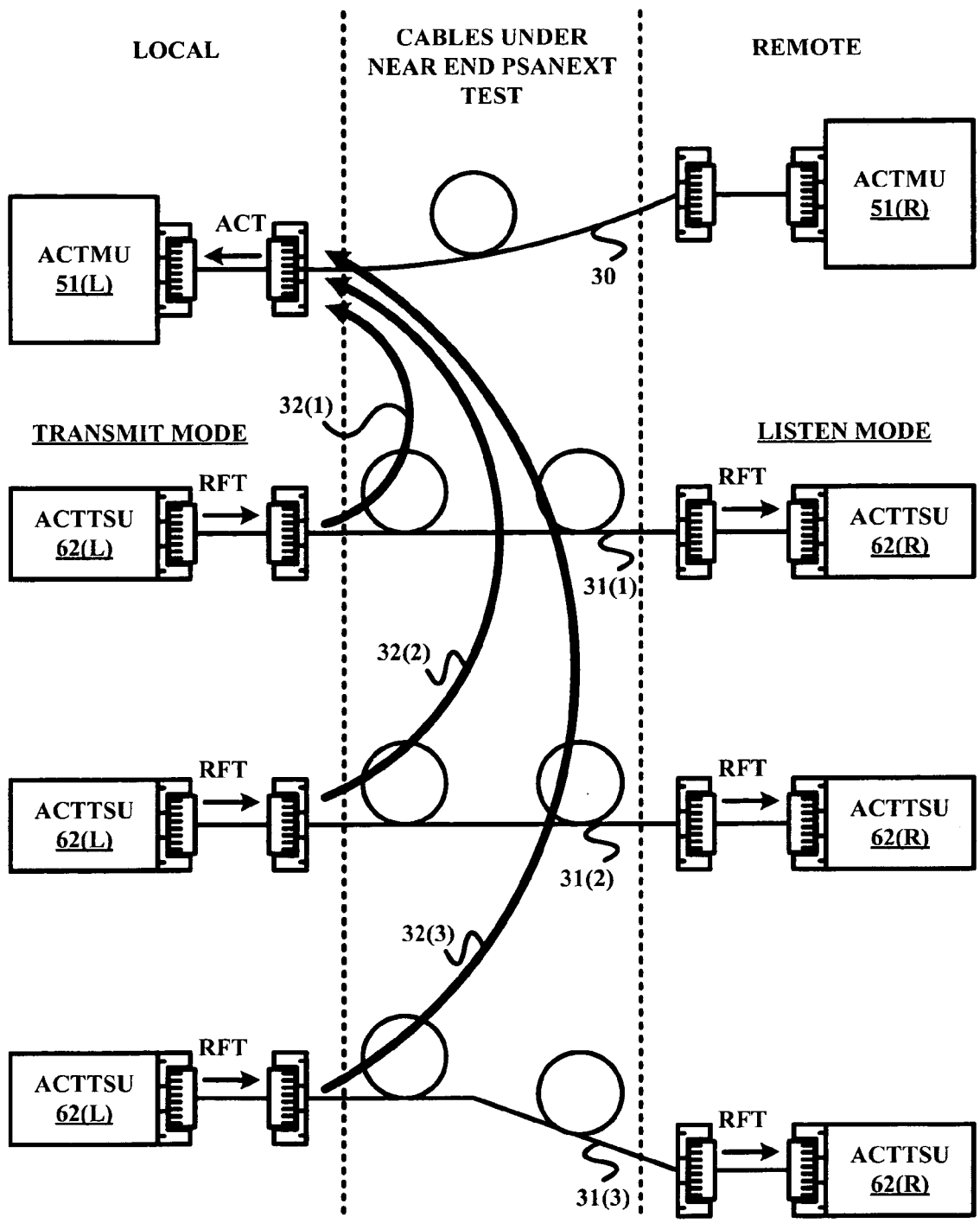
FIG. 13 illustrates an exemplary near end PSANEXT of the alien cross-talk system illustrated in FIG. 8 in accordance with the present invention.
Figure 14:
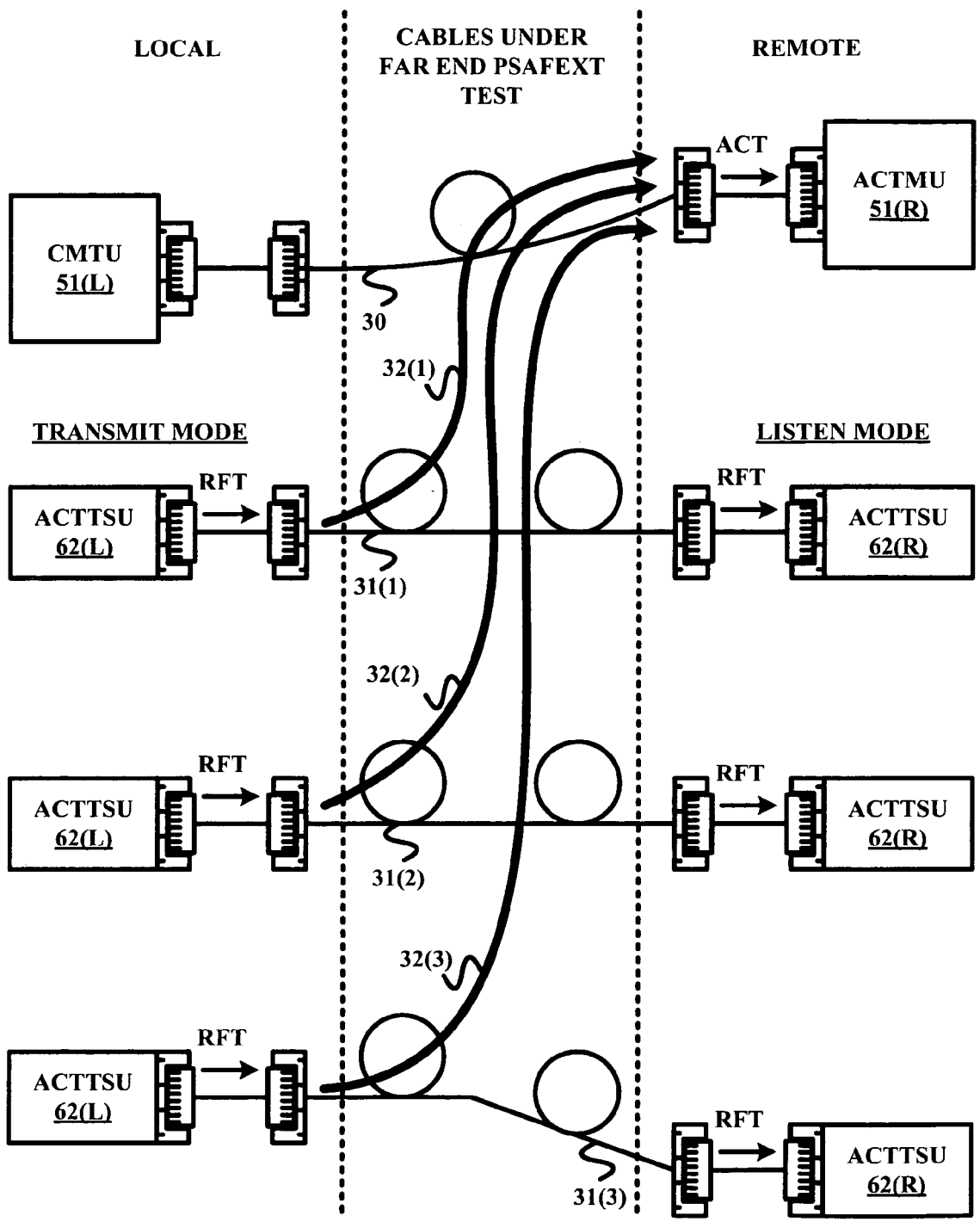
FIG. 14 illustrates an exemplary far end PSAFEXT of the alien cross-talk system illustrated in FIG. 8 in accordance with the present invention.
Figure 15:
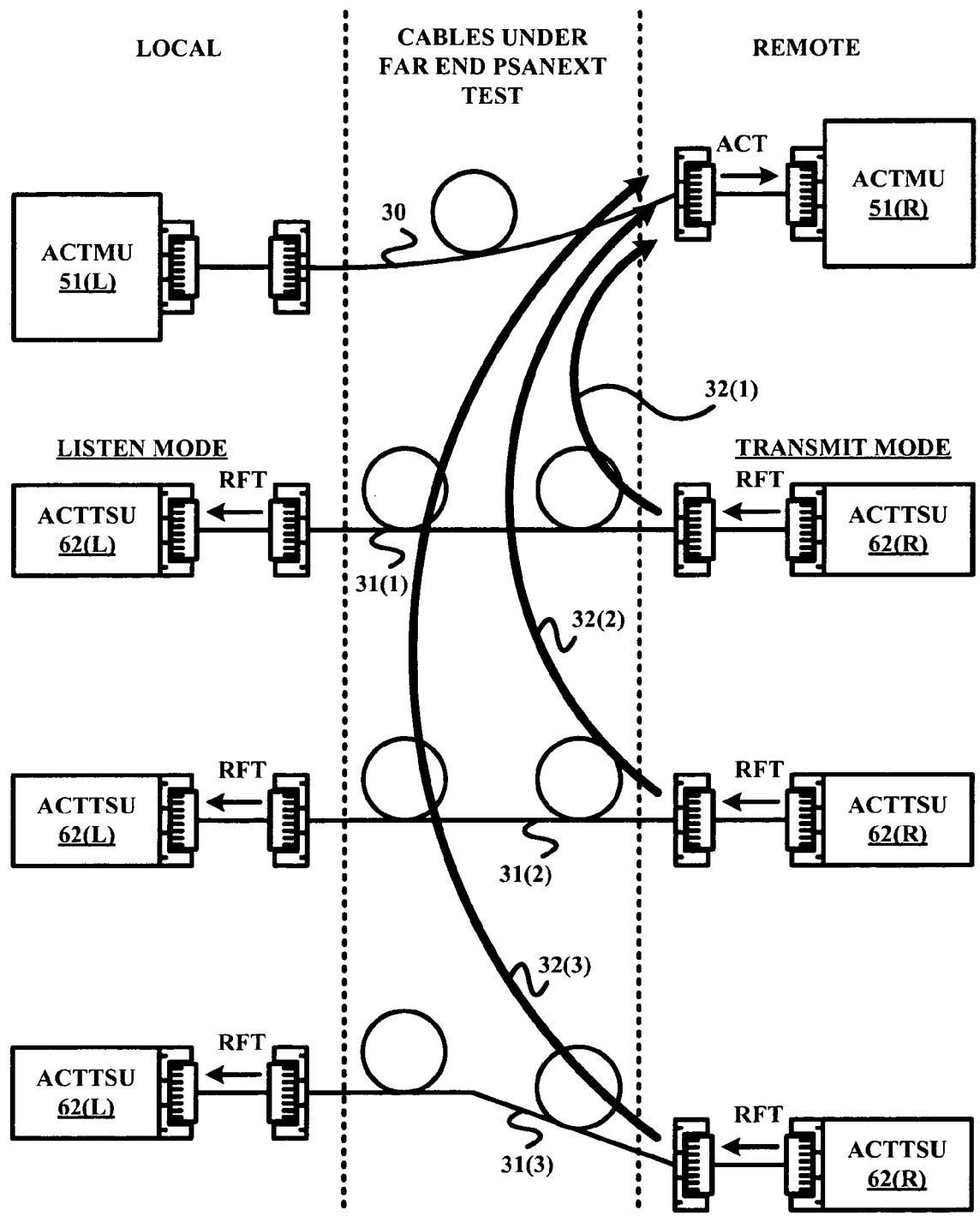
FIG. 15 illustrates an exemplary far end PSANEXT of the alien cross-talk system illustrated in FIG. 8 in accordance with the present invention.
Figure 16:
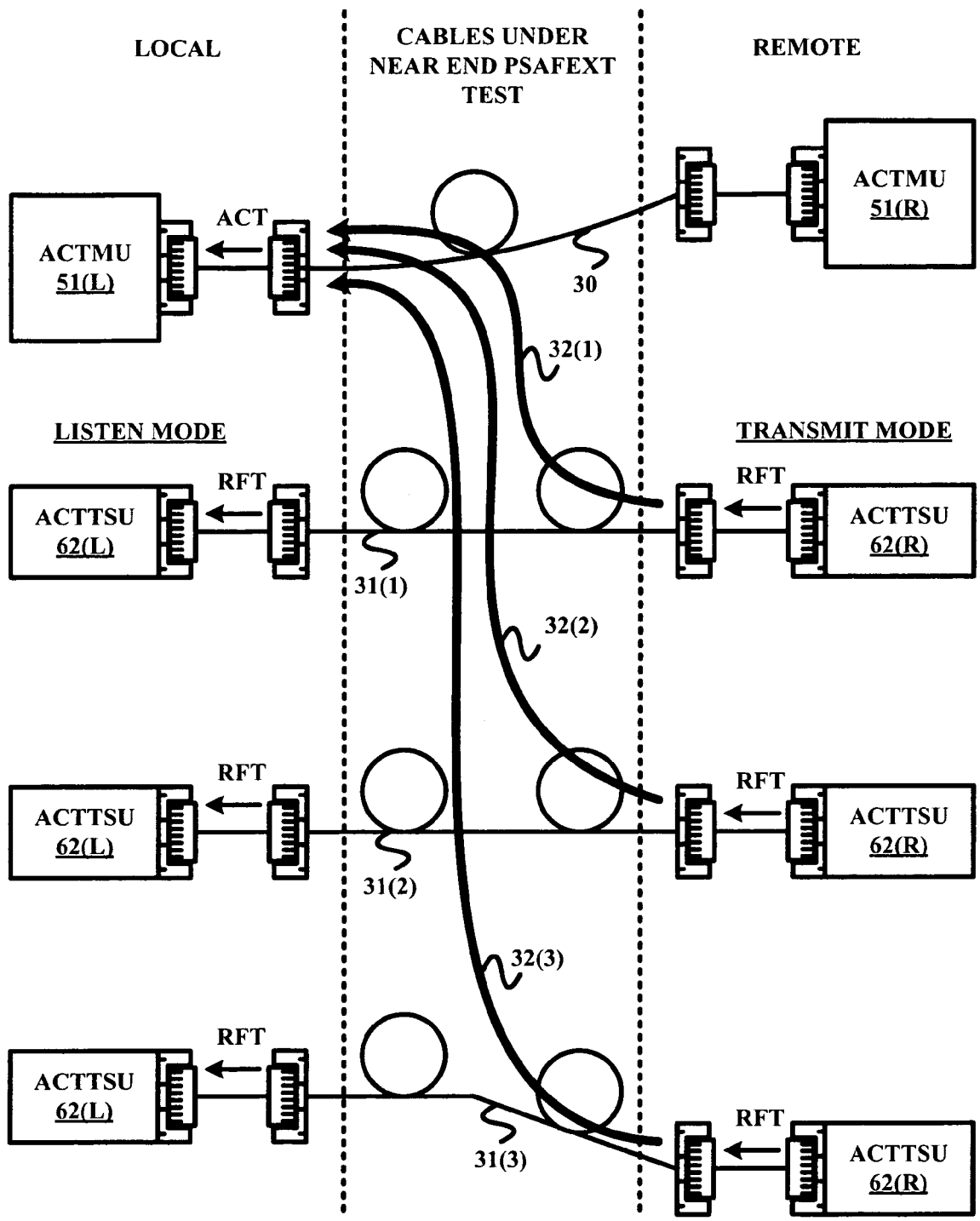
FIG. 16 illustrates an exemplary near end PSAFEXT of the alien cross-talk system illustrated in FIG. 8 in accordance with the present invention.

Referring to FIG. 9, controller 94 of a test unit 62 implements flowchart 120 in response to the test unit 62 serving as a local test unit under a near end powersum alien cross-talk near end ("PSANEXT") cable test shown in FIG. 13 or a far end powersum alien cross-talk far end ("PSAFEXT") cable test shown in FIG. 14, or as a remote test unit under a far end PSANEXT cable test shown in FIG. 15 or a near end PSAFEXT cable test shown in FIG. 16. A stage S122 of flowchart 120 encompasses controller 94 switching a corresponding test unit 62 from the termination mode to the transmit mode, and a stage S124 of flowchart 120 encompasses controller 94 commanding RF signal generator 104 to generate the RF test signal ("RFT") whereby the RF test signal is transmitted by test unit 62 to the connected disturber cable 31 as shown in FIGS. 13–16.

Figure 10:
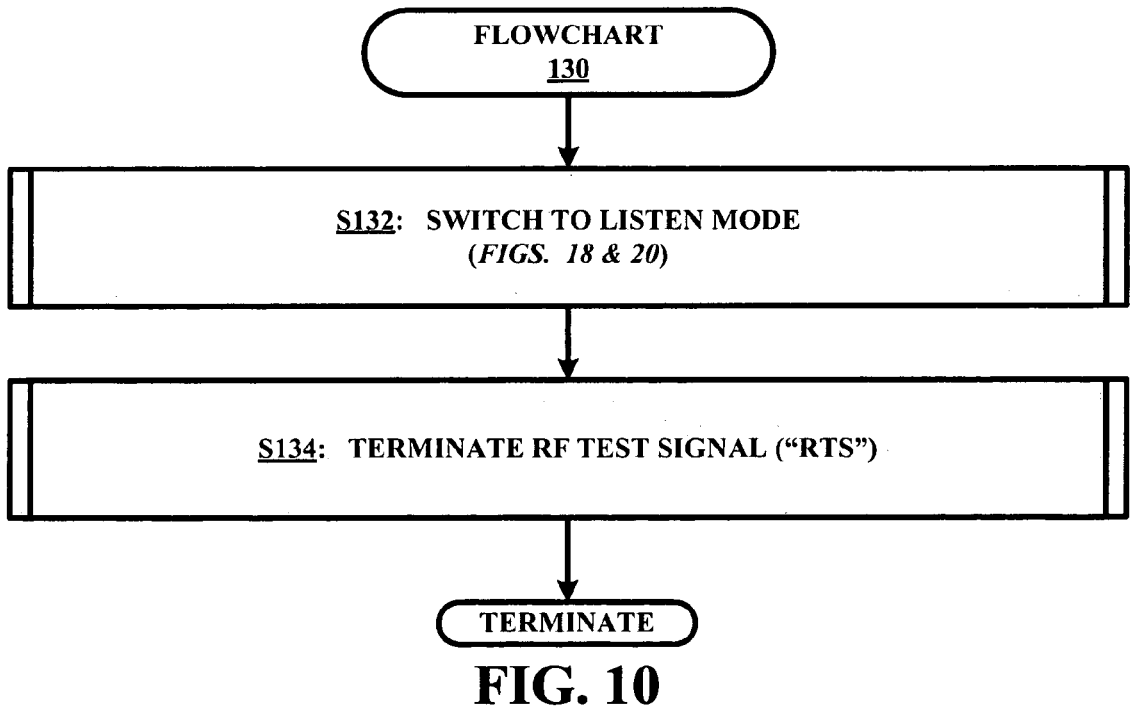
FIG. 10 illustrates a flowchart representative of one embodiment of a RF test signal termination method in accordance with the present invention.

Referring to FIG. 10, controller 94 of a test unit 62 implements flowchart 130 in response to the test unit 62 serving as a remote test unit under a near end PSANEXT cable test shown in FIG. 13 or a far end PSAFEXT cable test shown in FIG. 14, or as a local test unit under a far end PSANEXT cable test shown in FIG. 15 or a near end PSAFEXT cable test shown in FIG. 16. A stage S132 of flowchart 130 encompasses controller 94 switching a corresponding test unit 62 from the termination mode to the listen mode, and a stage S134 of flowchart 130 encompasses resistive signal terminator 103 terminating the RF test signal transmitted over the connected disturber cable 31 as shown in FIGS. 13–16.

Figure 11:
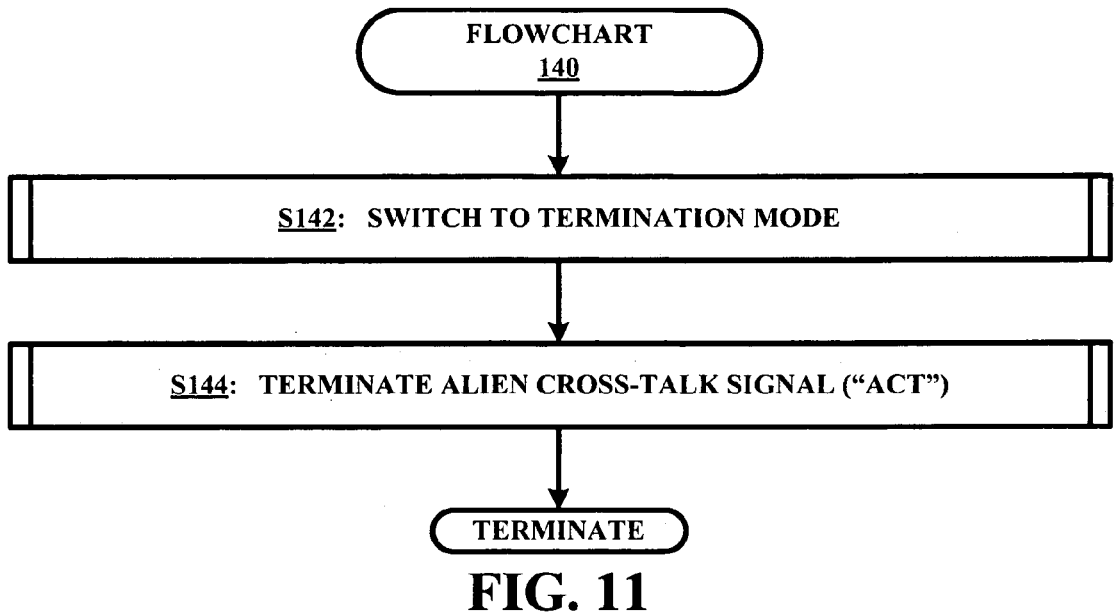
FIG. 11 illustrates a flowchart representative of one embodiment of an alien cross-talk signal termination method in accordance with the present invention.

Referring to FIG. 11, a controller (not shown) of measurement unit 51 implements flowchart 140 in response to the measurement unit 51 serving as a remote measurement unit under a near end PSANEXT cable test shown in FIG. 13 or a near end PSAFEXT cable test shown in FIG. 16, or as a local measurement unit under a far end PSAFEXT cable test shown in FIG. 14 or a far end PSANEXT cable test shown in FIG. 15. A stage S142 of flowchart 140 encompasses the controller of the measurement unit 51 being switched from an idle state to a termination mode, and a stage S144 of flowchart 140 encompasses a measurement unit 51 terminating an alien cross-talk signal ("ACT") generated on victim cable 30 in response to alien cross-talk couplings 32 between victim cable 30 and disturber cables 31 as the RF test signals are being transmitted over the disturber cables 31 as shown in FIGS. 13–16.

Figure 12:
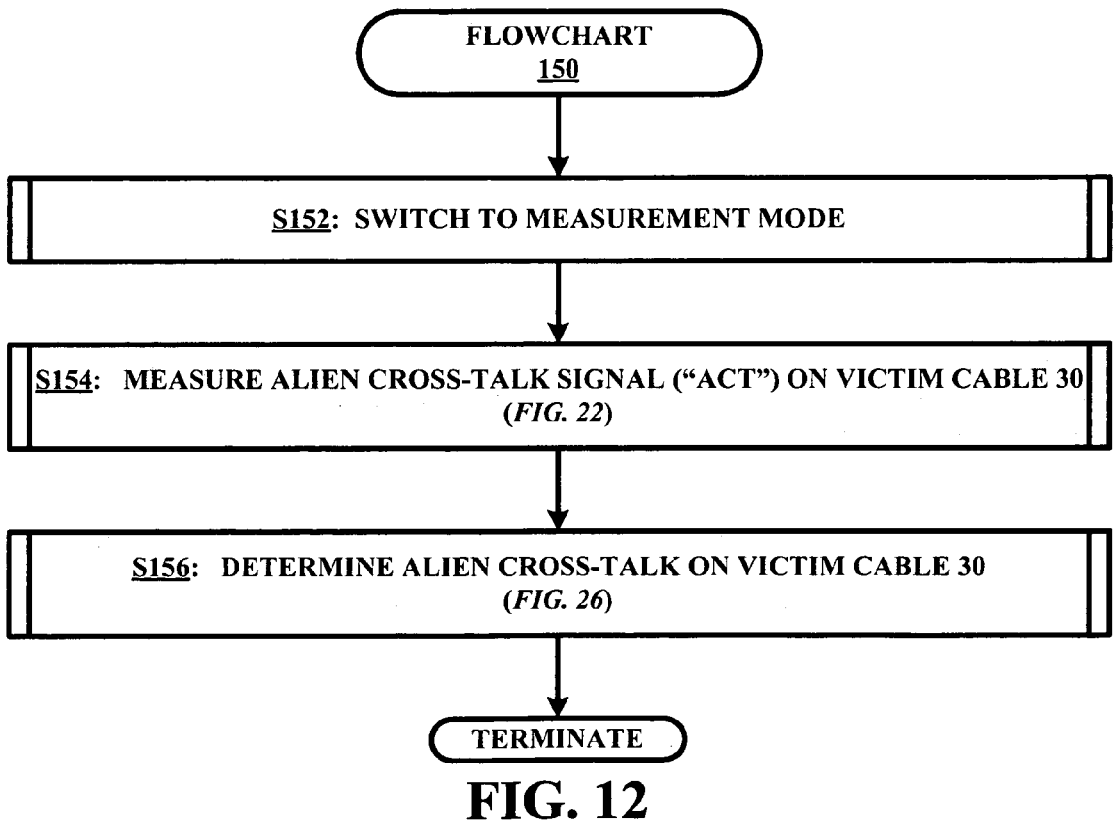
FIG. 12 illustrates a flowchart representative of one embodiment of an alien cross-talk measurement method in accordance with the present invention.

Referring to FIG. 12, the controller of a measurement unit 51 implements flowchart 150 in response to the measurement unit 51 serving as a local measurement unit under a near end PSANEXT cable test shown in FIG. 13 or a near end PSAFEXT cable test shown in FIG. 16, or as a remote measurement unit under a far end PSAFEXT cable test shown in FIG. 14 or a far end PSANEXT cable test shown in FIG. 15. A stage S152 of flowchart 150 encompasses a the controller of the measurement unit 51 being switched from an idle state to a measurement mode, and a stage S154 of flowchart 150 encompasses a measurement unit 51 measuring the alien cross-talk signal generated on victim cable 30 in response to alien cross-talk couplings 32 between victim cable 30 and disturber cables 31 as the RF test signals are being transmitted over the disturber cables 31 as shown in FIGS. 13–16. A final stage S165 of flowchart 150 encompasses the controller of the measurement unit 61 determining the alien cross-talk on victim cable 31 based on the measured alien cross-talk signal.

Exemplary embodiments of flowcharts 120–150 will now be described herein in connection with FIGS. 17–26 in the context of each test unit 62 shown in FIGS. 13–16 being set in the termination mode prior to receiving a command to transition to either the transmit mode or the listen mode.

Figure 17:
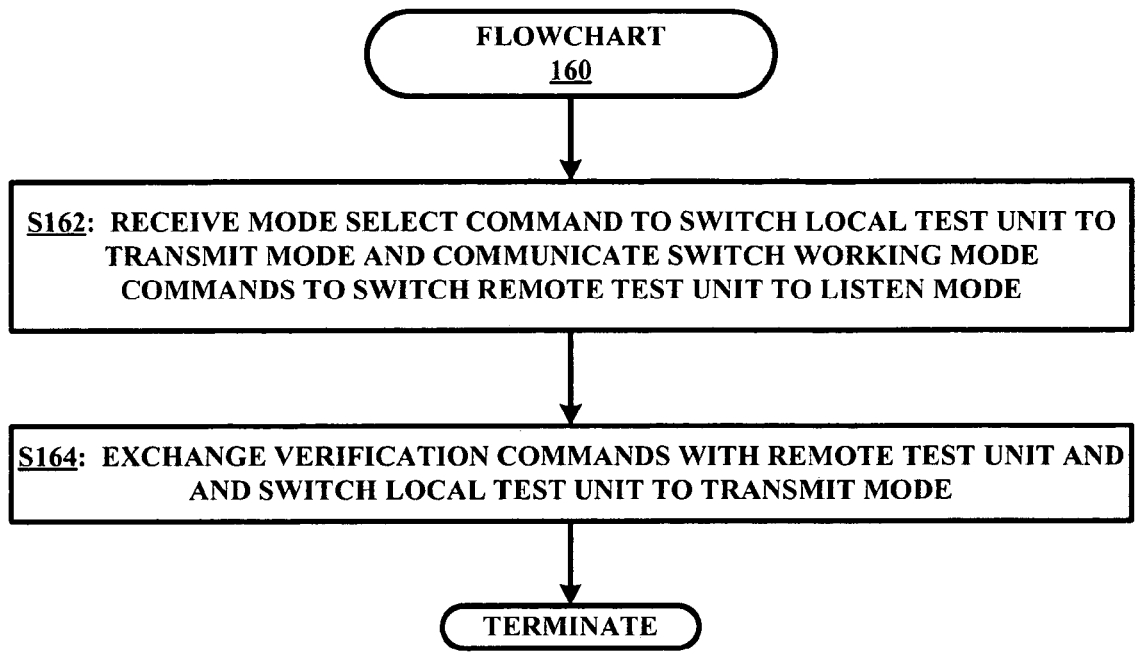
FIG. 17 illustrates a flowchart representative of one embodiment of a manual transmit mode selection method in accordance with the present invention.

FIG. 17 illustrates a flowchart 160 representative of a manual transmit mode selection method of the present invention applicable to test units 62 serving as local test units under near end PSANEXT shown in FIG. 13 and far end PSAFEXT shown in FIG. 14. A stage S162 of flowchart 160 encompasses a controller 94 of the local test unit 62(L) receiving a mode select command via a single press of key 97(1) (FIG. 6) to switch the local test unit 62(L) from the termination mode to the transmit mode and communicating two (2) switch working mode commands "10" to a corresponding remote test unit 62(R) to switch from the termination mode to the transmit mode and then to the listen mode. A stage S164 of flowchart 160 encompasses controller 94 of the local test unit 62(L) exchanging verification commands "11" with the remote test unit 62(R) and switching the local test unit 62(L) to the transition mode.

Figure 18:
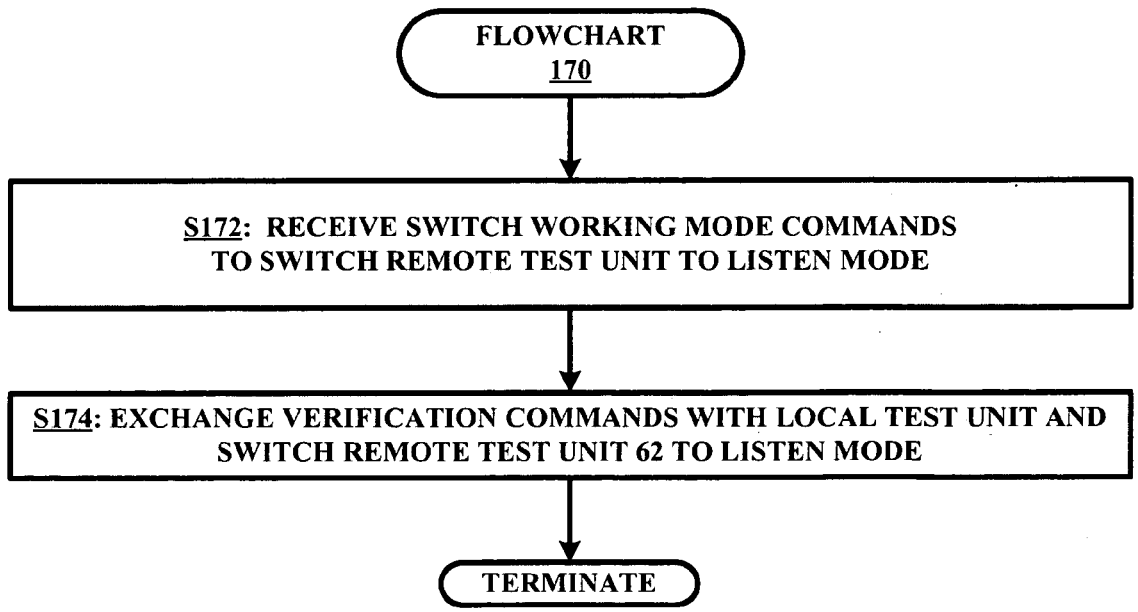
FIG. 18 illustrates a flowchart representative of one embodiment of an automatic listen mode selection method in accordance with the present invention.

FIG. 18 illustrates a flowchart 170 representative of an automatic listen mode selection method of the present invention applicable to test units 62 serving as remote test units under near end PSANEXT shown in FIG. 13 and far end PSAFEXT shown in FIG. 14. A stage S172 of flowchart 170 encompasses a controller 94 of the remote test unit 62(R) receiving the two (2) switch working mode commands "10" from the local test unit 62(L) to switch the remote test unit 62(R) from the termination mode to the transmit mode and then to the listen mode. A stage S174 of flowchart 170 encompasses controller 94 of the remote test unit 62(R) exchanging verification commands "11" with the local test unit 62(L) and switching the remote test unit 62(R) from the termination mode to the transmit mode and then to the listen mode.

Figure 19:
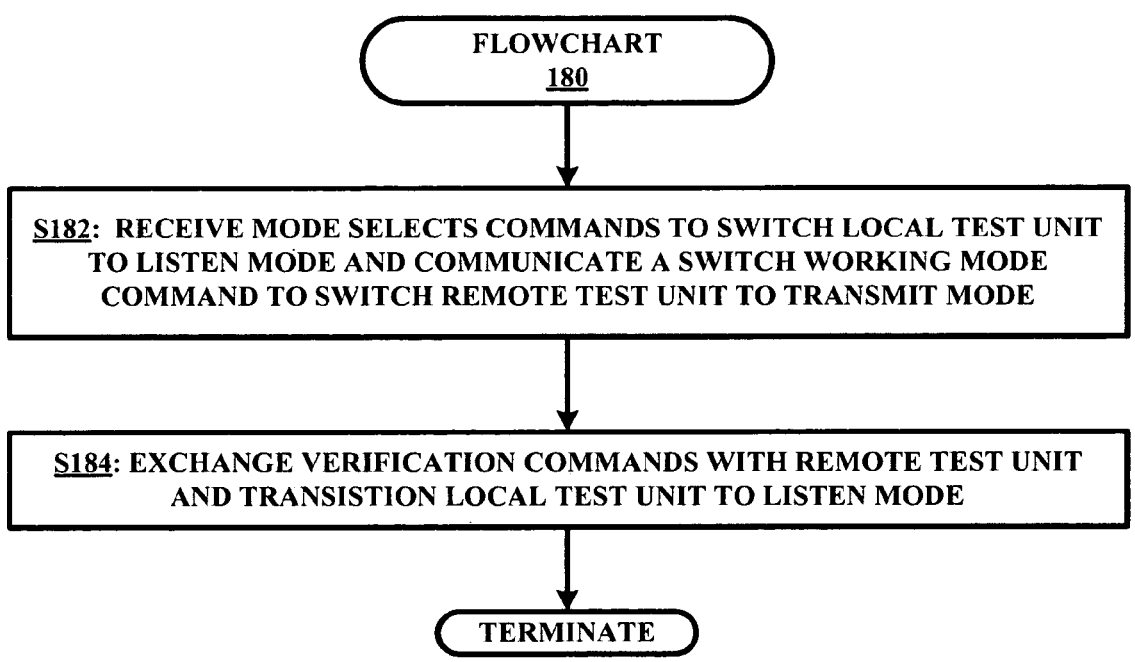
FIG. 19 illustrates a flowchart representative of one embodiment of a manual listen mode selection method in accordance with the present invention.

FIG. 19 illustrates a flowchart 180 representative of a manual listen mode selection method of the present invention applicable to test units 62 serving as local test units under far end PSANEXT shown in FIG. 15 and near end PSAFEXT shown in FIG. 516. A stage S182 of flowchart 180 encompasses a controller 94 of the local test unit 62(L) receiving two (2) mode select commands via a double press of key 97(1) (FIG. 6) to switch the local test unit 62(L) from the termination mode to the transmit mode and then to the listen mode, and communicating a single switch working mode command "10" to a corresponding remote test unit 62(R) to switch from the termination mode to the transmit mode. A stage S184 of flowchart 180 encompasses controller 94 of the local test unit 62(L) exchanging verification commands "11" with the remote test unit 62(R) and switching the local test unit 62(L) to the listen mode.

Figure 20:
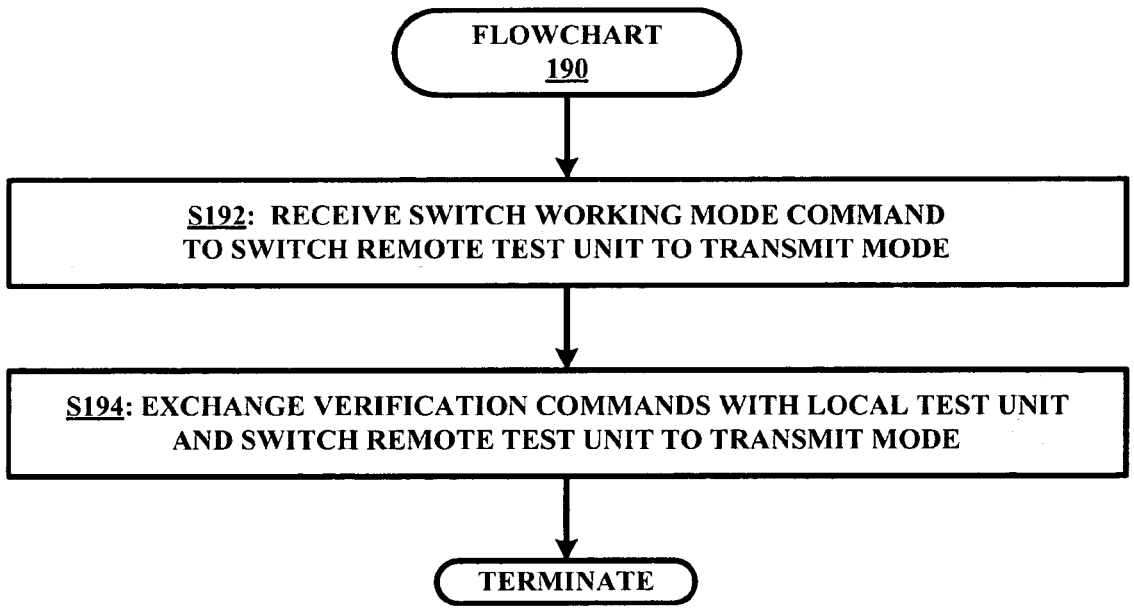
FIG. 20 illustrates a flowchart representative of one embodiment of an automatic transmit mode selection method in accordance with the present invention.

FIG. 20 illustrates a flowchart 190 representative of an automatic transmit mode selection method of the present invention applicable to test units 62 serving as remote test units under far end PSANEXT shown in FIG. 15 and near end PSAFEXT shown in FIG. 16. A stage S192 of flowchart 190 encompasses a controller 94 of the remote test unit 62(R) receiving the switch working mode command "10" from the local test unit 62(L) to switch the remote test unit 62(R) from the termination mode to the transmit mode. A stage S194 of flowchart 190 encompasses controller 94 of the remote test unit 62(R) exchanging verification commands "11" with the local test unit 62(L) and switching the remote test unit 62(R) from the termination mode to the transmit mode.

Figure 21:
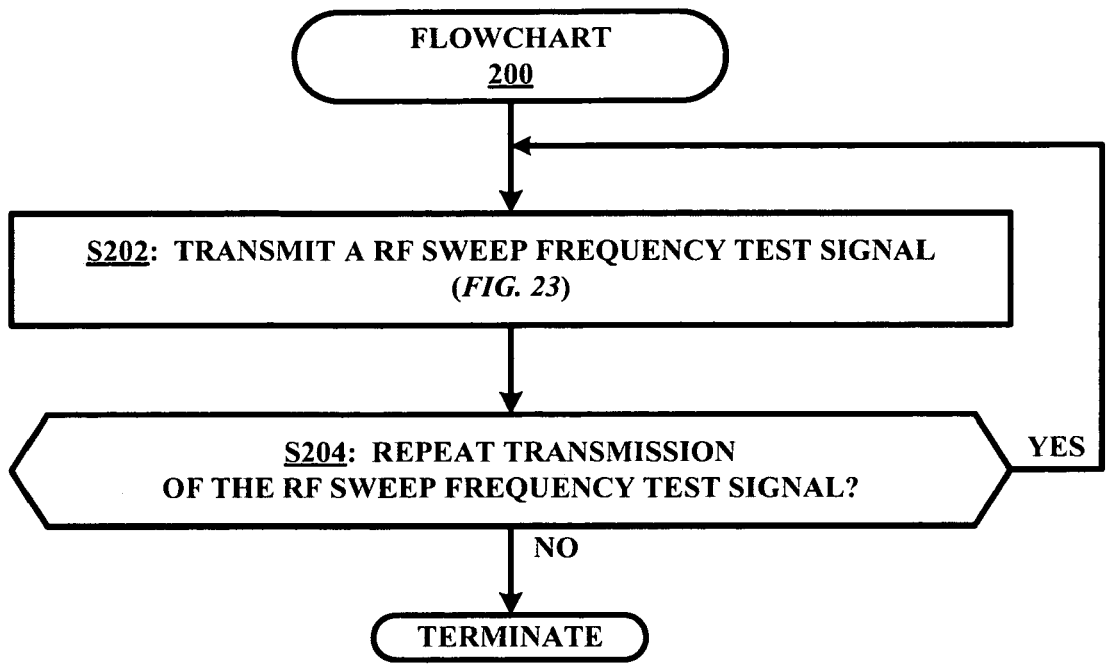
FIG. 21 illustrates a flowchart representative of one embodiment of a RF frequency sweep testing signal transmission method in accordance with the present invention.
Figure 23:
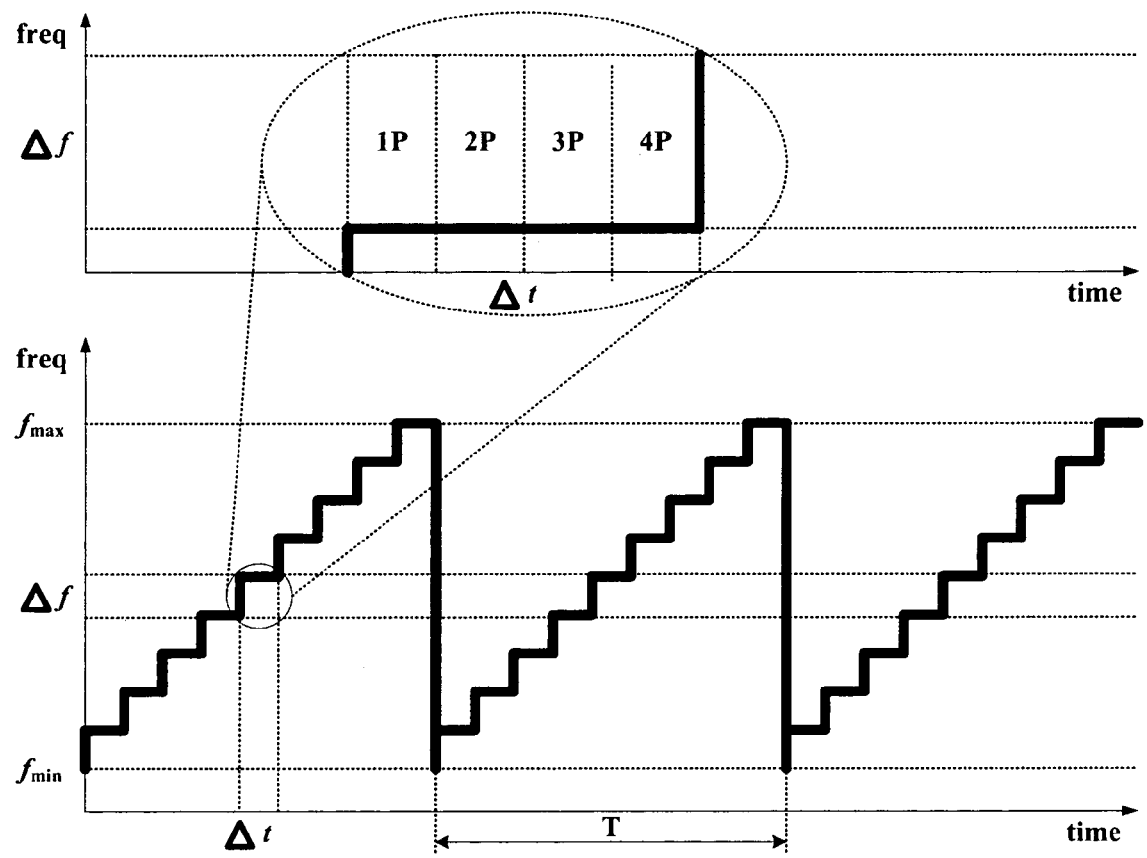
FIG. 23 illustrates one embodiment of a RF frequency sweep test signal in accordance with the present invention.

FIG. 21 illustrates a flowchart 200 representative of a RF frequency sweep test signal transmission method of the present invention as implemented by each test unit 62 shown in FIGS. 13–16 that are switched to the transmit mode. A stage S202 encompasses a controller 94 of a transmit mode test unit 62 controlling a transmission a RF frequency sweep test signal on the connected disturber cable 31. An exemplary RF frequency sweep test signal as shown in FIG. 23 has a frequency sweep range of $f_{MIN}$ (e.g., 1 MHz) to $f_{MAX}$ (e.g., 1 GHz) over a time period T whereby the frequency of the signal is incrementally increased by a frequency step size $\Delta f$ over each time period $\Delta t$. Furthermore, for a four (4) pair wire, the signal is transmitted to a different wire pair for ¼ $\Delta t$ for each frequency step size $\Delta f$ as shown in FIG. 23.

Referring again to FIG. 21, a stage S204 of flowchart 200 encompasses a controller 94 of the transmit mode test unit 62 determining whether to repeat the transmission of the RF frequency sweep test signal on the disturber cable 31 or to terminate flowchart 200. In one embodiment, a determination policy is implemented during stage S204 with the determination policy being based on a recognition that all of the test units 62 set in the transmit mode may or may not be synchronized measurement units 50 whereby it may be necessary to repeat the transmission for a specific amount of time to ensure proper measurement of the alien cross-talk on victim cable 30.

Figure 22:
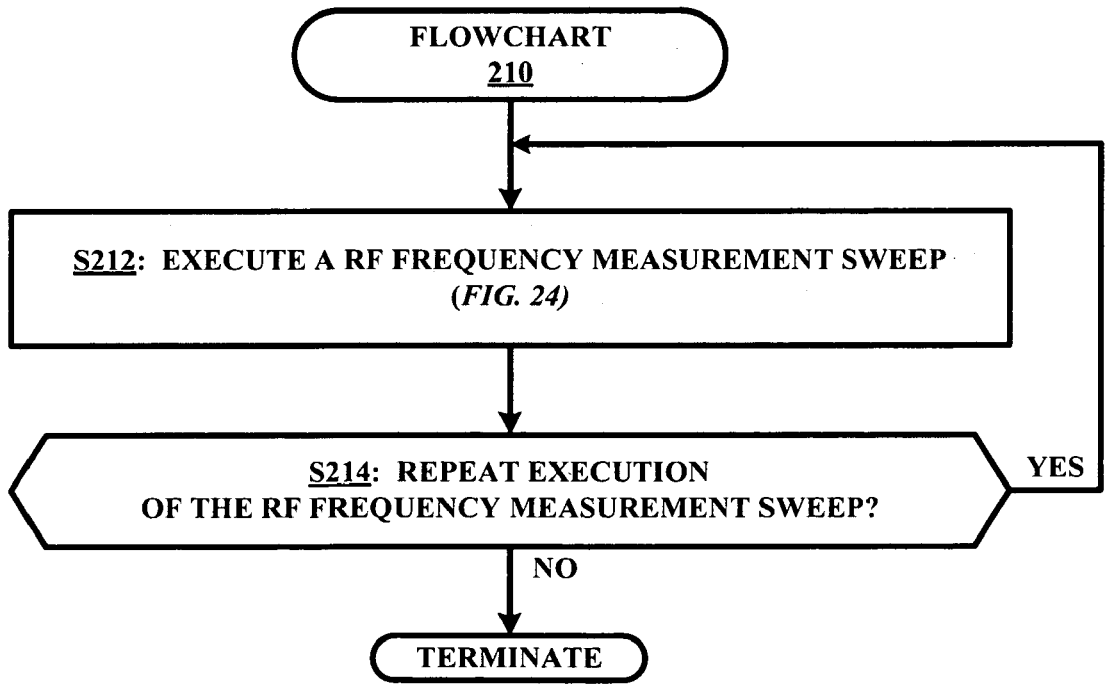
FIG. 22 illustrates a flowchart representative of one embodiment of RF frequency sweep measurement method in accordance with the present invention.

FIG. 22 illustrates a flowchart 210 representative of a RF frequency sweep measurement method of the present invention as implemented by each measurement unit 51 shown in FIGS. 13–16 that are switched to the measurement mode. A stage S212 encompasses the measurement unit 51 executing a RF frequency measurement sweep of victim cable 30. An exemplary RF frequency measurement sweep, of which three (3) steps are shown in FIG. 24, has a frequency sweep range of $f_{MIN}$ (e.g., 1 MHz) to $f_{MAX}$ (e.g., 1 GHz) over a time period xT (x being the number of frequency steps) whereby the frequency of the measurement sweep is incrementally increased by a frequency step size $\Delta f$ over each time period T.

Referring again to FIG. 22, a stage S214 of flowchart 200 encompasses a measuring unit 51 determining whether to repeat the RF frequency measurement sweep on the victim cable 30 or to terminate flowchart 220. In one embodiment, a determination policy is implemented during stage S214 with the determination policy being based on a recognition that all of the test units 62 set in the transmit mode may or may not be synchronized with the measurement unit 51 whereby it may be necessary to repeat the measurement sweep for a specific number of times.

Figure 24:
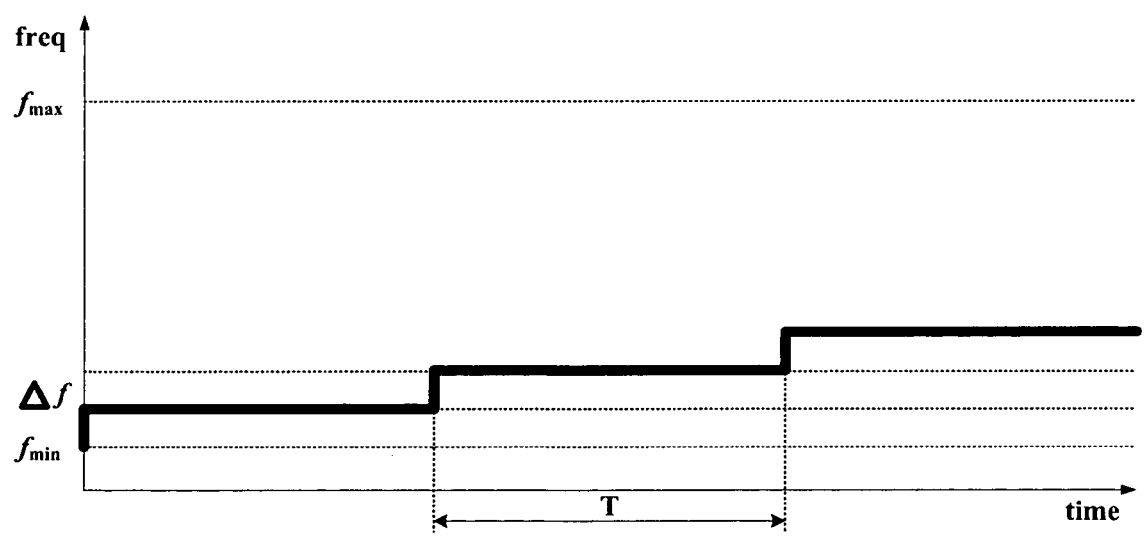
FIG. 24 illustrates one embodiment of a RF frequency measurement sweep in accordance with the present invention.
Figure 25:
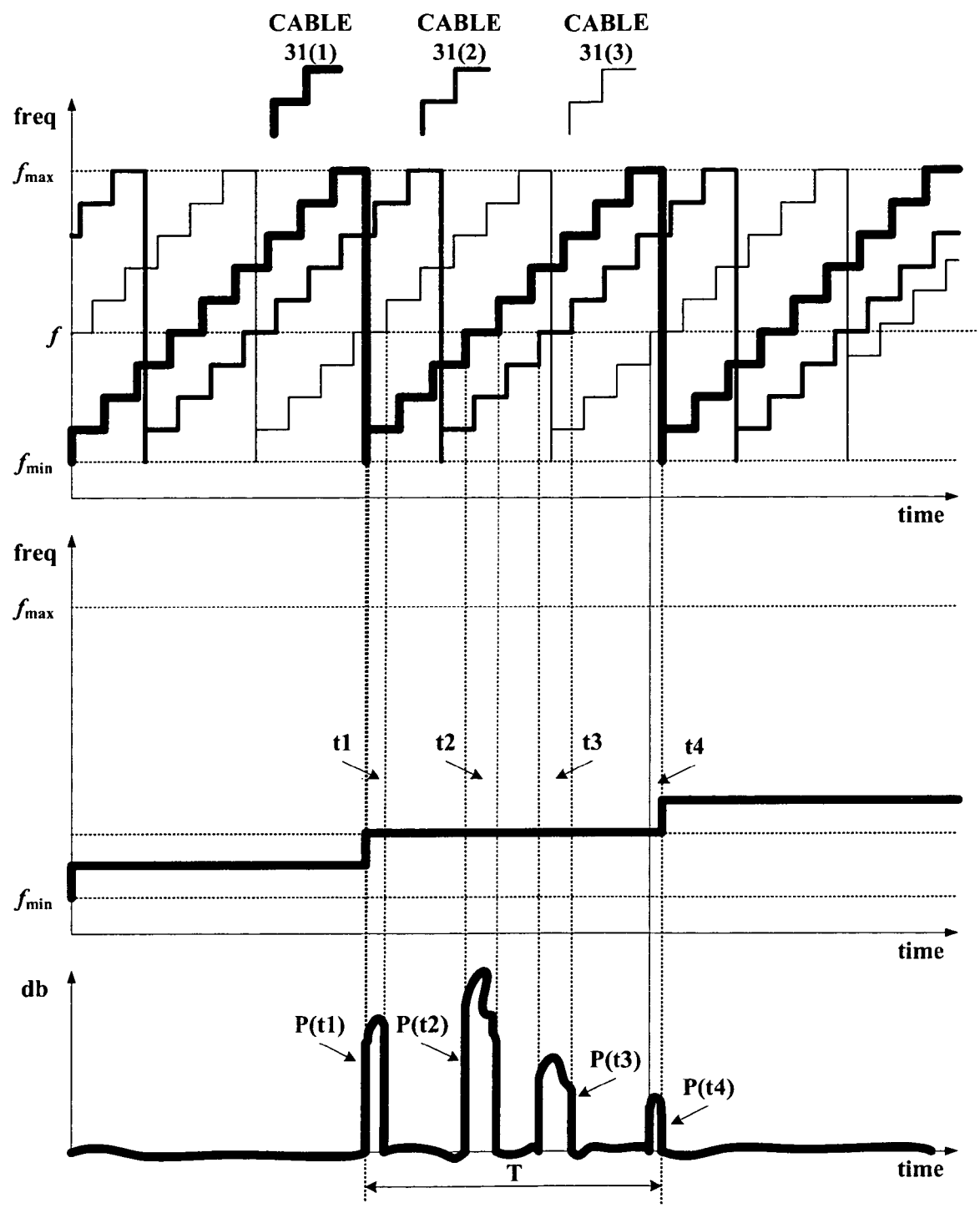
FIG. 25 illustrates an exemplary cross-talk between the RF frequency sweep test signal illustrated in FIG. 23 and the RF frequency measurement sweep illustrated in FIG. 24.

FIG. 25 illustrates an exemplary measurement of a alien cross-talk signal on victim cable in the context of RF frequency sweep test signals of FIG. 23 being simultaneously and asynchronously transmitted on disturber cables 31 and the RF frequency measurement sweep of FIG. 24 being performed on victim cable 30 for a particular frequency f. As shown in FIG. 25 for one of the T periods of the RF frequency measurement sweep, exemplary alien cross-talk data samples P(t1), P(t2), P(t3) and P(t4) in the alien cross-talk signal on victim cable 30 occur during respective time periods t1, t2, t3 and t4. Specifically, alien cross-talk data sample P(t1) is generated in response to the RF frequency sweep test signal on disturber cable 31(3) and the RF frequency measurement sweep on victim cable 30 having frequency f during time period t1 as shown in FIG. 25. Alien cross-talk data sample P(t2) is generated in response to the RF frequency sweep test signal on disturber cable 31 (1) and the RF frequency measurement sweep on victim cable 30 having frequency f during time period t2 as shown in FIG. 25. Alien cross-talk data sample P(t3) is generated in response to the RF frequency sweep test signal on disturber cable 31(2) and the RF frequency measurement sweep on victim cable 30 having frequency f during time period t3 as shown in FIG. 25. Alien cross-talk data sample P(t4) is generated in response to the RF frequency sweep test signal on disturber cable 31(3) and the RF frequency measurement sweep on victim cable 30 having frequency f during time period t4 as shown in FIG. 25. From this description of FIG. 25, those having ordinary skill in the art will appreciate the generation of four (4) alien cross-talk data samples for each frequency of the RF frequency measurement sweep of victim cable 30. Those having ordinary skill in the art will appreciate that each alien cross-talk data sample P can be equally divided into four (4) segments with each segment corresponding to a particular wire pair of victim cable 30. To this end, those having ordinary skill in the are will further appreciate that alien cross-talk data sample P(t1) and alien cross-talk data sample P(t4) both correspond to disturber cable 31(3) and therefore have to be combined as one data sample.

Figure 26:
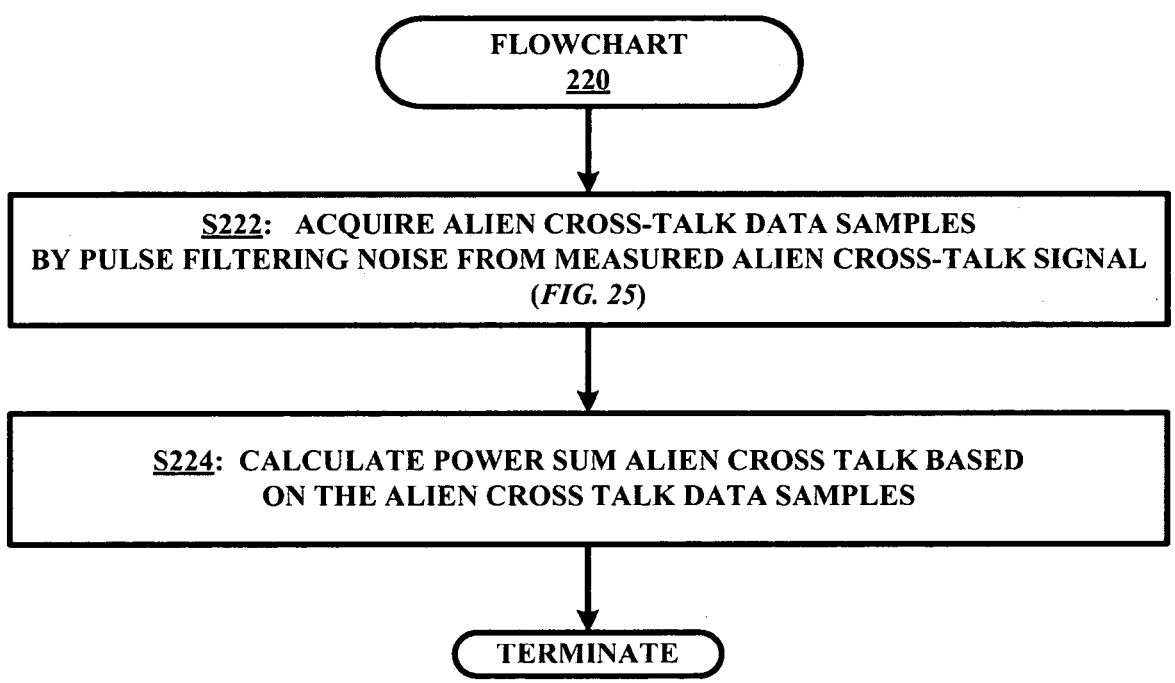
FIG. 26 illustrates a flowchart representative of one embodiment of a powersum alien cross-talk determination method in accordance with the present invention.

FIG. 26 illustrates a flowchart 220 representative of an alien cross-talk determination method of the present invention. A stage S222 of flowchart 220 encompasses a measurement unit 51 acquiring data samples from a measured alien cross-talk signal. These data samples will be first processed to filter measurement noise. This filtering, for example, can be in the form of a threshold filtering, allowing samples with value greater than a pre-defined threshold unchanged while setting the data samples with values below the threshold level to zero. In one embodiment, the threshold filtering is implemented in accordance with the following equation [1]:

$$Pk=Pk' \text{ if } Pk'>Th$$

$$Pk=0 \text{ if } Pk'<Th \quad [1]$$

where Pk' is kth data sample, Th is pre-determined threshold and Pk is the filtered data sample. For example, as shown in FIG. 25, a threshold filtering of the noise of the measured alien cross-talk signal involves the sampled pulses P(t1)-P(t4) of the alien cross-talk signal exceeding the threshold Th with the remaining noise of the alien cross-talk signal is set to zero. Those having ordinary skill in the art will appreciate the value of the pre-determined TH can be a function of a measured amount of noise on the victim cable absent any alien cross-talk coupling between the victim cable and any disturber cable.

A stage S224 of flowchart 220 encompasses a measurement unit 51 calculating a powersum alien cross-talk on victim cable 30 based on the filtered data samples in the stage 222. In one embodiment, the powersum alien cross-talk PSAXT on victim cable 30 is calculated in accordance with the following equation [2]:

$$PSAXT = \frac{M}{K} \sum_{k=1}^{xK} P_k \quad [2]$$

where M is the number of wire pairs in a cable (for example 4). P k ∈ [1,xK] are the filtered data samples per frequency at stage 222, x is the number of frequency steps, K is the total number of data samples acquired in the measurement unit in a duration Δt (corresponding to one frequency step of the test signal as in FIG. 23). The value of K is for example determined by the sampling speed of data acquisition hardware. Duration of one frequency step in the measurement frequency sweep, T, is determined by T=x ·Δt. In other words, one frequency step duration for measurement sweep equals entire sweep duration of test sweep.

From the above equation [2], those having ordinary skill in the art will appreciate that a summation of all of the samples of acquired data sample per frequency followed by a division of the total number of samples K per frequency step and a multiple of M provides a straightforward calculation of a powersum alien cross talk for a PSANEXT test or a PSAFEXT test.

Referring to FIGS. 8–26, those having ordinary skill in the art will appreciate how to apply the inventive principles of the present invention to an alien cross-talk environment of the present invention having less than or more than four (4) wire pairs per cable, and/or having less than or more than three (3) disturber cables.

Referring to FIGS. 1–26, those having ordinary skill in the art will appreciate the numerous advantages of the present invention including, but not limited to, a complete, convenient, cost effective and expedient measurement of alien cross-talk on a victim cable.

While the embodiments of the invention disclosed herein are presently considered to be preferred, various changes and modifications can be made without departing from the scope of the invention. The scope of the invention is indicated in the appended claims and all changes that come within the meaning and range of equivalents are intended to be embraced therein.

We claim:

1. An alien cross-talk testing method, comprising:
    transmitting a first RF test signal on a first disturber cable between a first alien cross-talk test signal unit connected to a first end of the first disturber cable and a second alien cross-talk test signal unit connected to a second end of the first disturber cable;
    transmitting a second RF test signal on a second disturber cable between a third alien cross-talk test signal unit connected to a first end of the second disturber cable and a fourth alien cross-talk test signal unit connected to a second end of the second disturber cable; and
    measuring an alien cross-talk signal generated on a victim cable in response to a first alien cross-talk coupling of the victim cable and the first disturber cable based on the transmission of the first RF test signal on the first disturber cable and in response to a second alien cross-talk coupling of the victim cable and the second disturber cable based on the transmission of the second RF test signal on the second disturber cable.

2. The alien cross-talk testing method of claim 1, further comprising:
    manually setting the first alien cross-talk test unit to generate the first RF test signal; and
    automatically setting the second alien cross-talk unit to terminate the first RF test signal based on the manual setting of the first alien cross-talk test unit to generate the first RF test signal.

3. The alien cross-talk testing method of claim 1, further comprising:
    manually setting the first alien cross-talk test unit to terminate the first RF test signal; and
    automatically setting the second alien cross-talk unit to generate the first RF test signal based on the manual setting of the first alien cross-talk test unit to terminate the first RF test signal.

4. The alien cross-talk testing method of claim 1, further comprising:
    setting a first alien cross-talk measurement unit connected to a first end of the victim cable to terminate the alien cross-talk signal; and
    setting a second alien cross-talk measurement unit connected to a second end of the victim cable to measure the alien cross-talk signal.

5. The alien cross-talk testing method of claim 4, wherein the second alien cross-talk measurement unit is set to measure the alien cross-talk signal as a function of each wire pair of the victim cable.

6. The alien cross-talk testing method of claim 4, wherein the second alien cross-talk measurement unit is set to measure the alien cross-talk signal as a function of a pulse filtering of the alien cross-talk signal based on each wire pair of the victim cable.

7. An alien cross-talk testing method, comprising:
    transmitting a first RF frequency sweep test signal on a first disturber cable between a first alien cross-talk test signal unit connected to a first end of the first disturber cable and a second alien cross-talk test signal unit connected to a second end of the first disturber cable; and executing a RF frequency measurement sweep of an alien cross-talk signal generated on a victim cable in response to a first alien cross-talk coupling of the victim cable and the first disturber cable based on the transmission of the first RF frequency sweep test signal on the first disturber cable.

8. The alien cross-talk testing method of claim 7, further comprising:

transmitting a second RF frequency sweep test signal on a second disturber cable between a third alien cross-talk test signal unit connected to a first end of the second disturber cable and a fourth alien cross-talk test signal unit connected to a second end of the second disturber cable, wherein the alien cross-talk signal generated on the victim cable is in further response to a second alien cross-talk coupling of the victim cable and the second disturber cable based on the transmission of the second RF frequency sweep test signal on the second disturber cable.

9. The alien cross-talk testing method of claim 7, further comprising:

manually setting the first alien cross-talk test unit to generate the first RF frequency sweep test signal; and automatically setting the second alien cross-talk unit to terminate the first RF frequency sweep test signal based on the manual setting of the first alien cross-talk test unit to generate the first RF frequency sweep test signal.

10. The alien cross-talk testing method of claim 7, further comprising:

manually setting the first alien cross-talk test unit to terminate the first RF frequency sweep test signal; and automatically setting the second alien cross-talk unit to generate the first RF frequency sweep test signal based on the manual setting of the first alien cross-talk test unit to terminate the first RF frequency sweep test signal.

11. The alien cross-talk testing method of claim 7, wherein the RF frequency sweep test signal includes a plurality of sine waves having a stepped-up test pattern; and wherein the RF frequency measurement sweep has a stepped-up measurement pattern.

12. The alien cross-talk testing method of claim 7, wherein the RF test signal includes a continuous and periodic pattern of frequency sweep with each frequency sweep consisting of a pre-determined number of frequency steps.

13. The alien cross-talk testing method of claim 7, further comprising:

setting a first alien cross-talk measurement unit connected to a first end of the victim cable to terminate the alien cross-talk signal; and setting a second alien cross-talk measurement unit connected to a second end of the victim cable to execute the RF frequency measurement sweep of the alien cross-talk signal.

14. An alien cross-talk testing method, comprising:

transmitting a first RF frequency sweep test signal on a first disturber cable between a first alien cross-talk test signal unit connected to a first end of the first disturber cable and a second alien cross-talk test signal unit connected to a second end of the first disturber cable; and acquiring alien cross-talk data samples based on a threshold filtering of an alien cross-talk signal generated on a victim cable in response to a first alien cross-talk coupling of the victim cable and the first disturber cable based on the transmission of the first RF frequency sweep test signal on the first disturber cable.

15. The alien cross-talk testing method of claim 14, further comprising:

transmitting a second RF frequency sweep test signal on a second disturber cable between a third alien cross-talk test signal unit connected to a first end of the second disturber cable and a fourth alien cross-talk test signal unit connected to a second end of the second disturber cable, wherein the alien cross-talk signal generated on the victim cable is in further response to a second alien cross-talk coupling of the victim cable and the second disturber cable based on the transmission of the second RF frequency sweep test signal on the second disturber cable.

16. The alien cross-talk testing method of claim 14, further comprising:

manually setting the first alien cross-talk test unit to generate the first RF frequency sweep test signal; and automatically setting the second alien cross-talk unit to terminate the first RF frequency sweep test signal based on the manual setting of the first alien cross-talk test unit to generate the first RF frequency sweep test signal.

17. The alien cross-talk testing method of claim 14, further comprising:

manually setting the first alien cross-talk test unit to terminate the first RF frequency sweep test signal; and automatically setting the second alien cross-talk unit to generate the first RF frequency sweep test signal based on the manual setting of the first alien cross-talk test unit to terminate the first RF frequency sweep test signal.

18. The alien cross-talk testing method of claim 14, wherein the RF test signal includes a first continuous and periodic pattern of frequency sweep with each frequency sweep of the first continuous and periodic pattern of frequency sweep consisting of a pre-determined number of frequency steps; and wherein the RF frequency measurement sweep includes a second continuous and periodic pattern of frequency sweep with each frequency sweep of the second continuous and periodic pattern of frequency sweep consisting of the pre-determined number of frequency steps; and wherein a frequency step duration of RF frequency measurement sweep is equal to a frequency sweep duration of the RF frequency sweep test signal.

19. The alien cross-talk testing method of claim 14, wherein the RF frequency sweep test signal includes a plurality of sine waves having a stepped-up test pattern over a first time period;

wherein the RF frequency measurement sweep has a stepped-up measurement pattern over a second time period that is a multiple of the first time period; and wherein a first frequency step size of the RF frequency sweep test signal is identical to a second frequency step size of the RF frequency measurement sweep.

20. The alien cross-talk testing method of claim 14, further comprising:
   setting a first alien cross-talk measurement unit connected to a first end of the victim cable to terminate the alien cross-talk signal; and
   setting a second alien cross-talk measurement unit connected to a second end of the victim cable to execute a RF frequency measurement sweep of the victim cable, wherein the threshold filtering of the alien cross-talk signal is a function of the RF frequency sweep test signal having a definite test pattern and the RF frequency measurement sweep having a definitive measurement pattern that collectively facilitate a filter sampling of the alien cross-talk signal on the victim cable.

* * * * *